United States Patent
Taherzadeh Boroujeni et al.

(10) Patent No.: US 12,212,527 B2
(45) Date of Patent: Jan. 28, 2025

(54) TRANSMISSION AND RECEPTION OF PHYSICAL DOWNLINK CONTROL CHANNELS

(71) Applicant: InterDigital Patent Holdings, Inc., Wilmington, DE (US)

(72) Inventors: Mahmoud Taherzadeh Boroujeni, San Diego, CA (US); Moon-il Lee, Melville, NY (US); Afshin Haghighat, Ile-Bizard (CA); Shahrokh Nayeb Nazar, San Diego, CA (US); Oghenekome Oteri, San Diego, CA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 114 days.

(21) Appl. No.: 17/726,703

(22) Filed: Apr. 22, 2022

(65) Prior Publication Data

US 2022/0255710 A1     Aug. 11, 2022

Related U.S. Application Data

(63) Continuation of application No. 16/481,893, filed as application No. PCT/US2018/016630 on Feb. 2, 2018, now Pat. No. 11,316,649.
(Continued)

(51) Int. Cl.
    *H04L 5/00*     (2006.01)
(52) U.S. Cl.
    CPC .......... *H04L 5/0091* (2013.01); *H04L 5/0007* (2013.01); *H04L 5/0053* (2013.01)
(58) Field of Classification Search
    CPC .... H04L 5/0091; H04L 5/0007; H04L 5/0053
    See application file for complete search history.

(56) References Cited

U.S. PATENT DOCUMENTS

| 10,757,581 B2 | 8/2020 | Hwang et al. |
| 10,887,069 B2 | 1/2021 | Xu et al. |

(Continued)

FOREIGN PATENT DOCUMENTS

| CN | 103795514 A | 5/2014 |
| CN | 104272613 A | 1/2015 |

(Continued)

OTHER PUBLICATIONS

3GPP TSG RAN WG1 Meeting #89 entitled "Discussion on REG bundling" by LG Electronics, R1-1707623, 3 pages, May 15-19, 2017. (Year: 2017).*

(Continued)

*Primary Examiner* — Won Tae C Kim
(74) *Attorney, Agent, or Firm* — Condo Roccia Koptiw LLP

(57) ABSTRACT

A wireless transmit/receive unit (WTRU) may receive a PDCCH transmission comprising a CCE that is mapped to one or more REGs based on a CCE-to-REG mapping. The WTRU may receive the CCE-to-REG mapping that indicates a REG bundle corresponding to the CCE and use the CCE-to-REG mapping to identify the REGs for the WTRU. Depending on whether the CCE-to-REG mapping is interleaving or noninterleaving, the CCE-to-REG mapping may be based on different parameters. If the CCE-to-REG mapping is interleaving, the CCE-to-REG mapping may be based on an index associated with the CCE and a number of REGs in the REG bundle. If the CCE-to-REG mapping is noninterleaving, the CCE-to-REG mapping may be based on the index of the CCE.

20 Claims, 19 Drawing Sheets

Related U.S. Application Data

(60) Provisional application No. 62/565,646, filed on Sep. 29, 2017, provisional application No. 62/555,742, filed on Sep. 8, 2017, provisional application No. 62/543,100, filed on Aug. 9, 2017, provisional application No. 62/519,262, filed on Jun. 14, 2017, provisional application No. 62/501,001, filed on May 3, 2017, provisional application No. 62/474,924, filed on Mar. 22, 2017, provisional application No. 62/454,635, filed on Feb. 3, 2017.

(56) References Cited

U.S. PATENT DOCUMENTS

| | | |
|---|---|---|
| 2009/0238131 A1 | 9/2009 | Montojo et al. |
| 2010/0195583 A1 | 8/2010 | Nory et al. |
| 2011/0044259 A1 | 2/2011 | Nimbalker et al. |
| 2012/0176961 A1 | 7/2012 | Ayako et al. |
| 2013/0194931 A1 | 8/2013 | Lee et al. |
| 2013/0275400 A1 | 10/2013 | Rus et al. |
| 2014/0092830 A1 | 4/2014 | Chen et al. |
| 2015/0036616 A1 | 2/2015 | Seungmin et al. |
| 2015/0163782 A1 | 6/2015 | Hyoungju et al. |
| 2015/0296489 A1 | 10/2015 | Bo et al. |
| 2017/0164395 A1 | 6/2017 | Papasakellariou et al. |
| 2018/0283875 A1 | 10/2018 | Wang |
| 2019/0037540 A1 | 1/2019 | Seo et al. |
| 2019/0069276 A1 | 2/2019 | Kwak et al. |
| 2019/0141679 A1 | 5/2019 | He et al. |
| 2019/0356524 A1* | 11/2019 | Yi .................... H04W 48/16 |
| 2020/0187236 A1 | 6/2020 | Moon et al. |

FOREIGN PATENT DOCUMENTS

| | | |
|---|---|---|
| CN | 104272614 A | 1/2015 |
| CN | 104769871 A | 7/2015 |
| CN | 104823394 A | 8/2015 |
| CN | 105180941 A | 12/2015 |
| WO | WO2011040024 A1 | 4/2011 |
| WO | WO2013049768 A1 | 4/2013 |
| WO | WO 2013-112972 A1 | 8/2013 |
| WO | WO 2017/192399 A1 | 4/2017 |

OTHER PUBLICATIONS

3rd Generation Partnership Project (3GPP), R1-1706946, "CCE-to-REG Mapping", Huawei, HiSilicon, 3GPP TSG RAN WG1 Meeting #89, Hangzhou, China, May 15-19, 2017, 7 pages.

3rd Generation Partnership Project (3GPP), R1-1707626, "Discussion on CORESET Configuration", LG Electronics, 3GPP TSG RAN WG1 Meeting #89, Hangzhou, P.R. China, May 15-19, 2017, pp. 1-5.

$3^{rd}$ Generation Partnership Project (3GPP), R1-161019, "NB-PDCCH design for NB-IoT", NTT DOCOMO, 3GPP TSG RAN WG1, Meeting # 84, St. Julian's, Malta, Feb. 15-19, 2016, 5 pages.

$3^{rd}$ Generation Partnership Project (3GPP), R1-1700493, "Discussion on control channel design", LG Electronics, 3GPP TSG RAN WG1, Meeting NR Ad-Hoc Meeting, Spokane, USA, Jan. 16-20, 2017, 7 pages.

$3^{rd}$ Generation Partnership Project (3GPP), R1-1700718, "Blocking probability of control channel for URLLC", InterDigital Communications, 3GPP TSG RAN WG1, AH_NR Meeting, Spokane, USA, Jan. 16-20, 2017, 6 pages.

$3^{rd}$ Generation Partnership Project (3GPP), 3GPP R1-074581, "Interleaver Design for Control Channel Element to RE Group Mapping", Motorola, 3GPP TSG RAN1 #51, Jeju, Korea, Nov. 5-9, 2007, 12 pages.

$3^{rd}$ Generation Partnership Project (3GPP), 3GPP R1-1704204, "Discussion on NR-PDCCH structure", Huawei, HiSilicon, 3GPP TSG RAN WG1 Meeting #88bis, Spokane, USA, Apr. 3-7, 2017, 4 pages.

3rd Generation Partnership Project (3GPP), R1-1707702, "NR-PDCCH CCE-to-REG mapping with REG bundling", 3GPP TSG RAN WG1 meeting #89, Guangdong OPPO Mobile Telecom, Hangzhou, PR China, May 15-19, 2017, 5 pages.

3rd Generation Partnership Project (3GPP), 3GPP R1-1708098, "On REG interleaving for distributed NR-PDCCH", 3GPP TSG RAN WG1 #89, ETRI, Hangzhou, China, May 15-19, 2017, 5 pages.

* cited by examiner

FIG. 11B

TRANSMISSION AND RECEPTION OF PHYSICAL DOWNLINK CONTROL CHANNELS

CROSS-REFERENCE

This application is a continuation of U.S. Ser. No. 16/481,893 (now U.S. Pat. No. 11,316,649), which is the National Stage entry under 35 U.S.C. § 371 of Patent Cooperation Treaty Application PCT/US2018/016630, filed Feb. 2, 2018, which claims the benefit of U.S. Provisional Application No. 62/454,635, filed on Feb. 3, 2017; U.S. Provisional Application No. 62/474,924, filed on Mar. 22, 2017; U.S. Provisional Application No. 62/501,001, filed on May 3, 2017; U.S. Provisional Application No. 62/519,262, filed on Jun. 14, 2017; U.S. Provisional Application No. 62/543,100, filed on Aug. 9, 2017, U.S. Provisional Application No. 62/555,742, filed Sep. 8, 2017; and U.S. Provisional Application No. 62/565,646, filed on Sep. 29, 2017, the entire disclosures of each which are incorporated herein by reference as if fully set forth.

BACKGROUND

In Long Term Evolution (LTE), physical downlink control channel (PDCCH) is for the downlink control channel. To address some of the shortcoming of PDCCH, enhanced PDCCH (E-DPCCH) is used for the downlink control channel of LTE Advanced. E-DPCCH divides the resources between data and control, using frequency-division multiplexing (FDM). In frequency tones assigned for the control channel, E-DPCCH may cover the whole subframe (instead of just the beginning three or four to orthogonal frequency-division multiplex (OFDM) symbols).

SUMMARY

A wireless transmit/receive unit (WTRU) may receive a PDCCH transmission comprising a control channel element (CCE) that is mapped to one or more resource element groups (REGs) based on a CCE-to-REG mapping. The WTRU may receive the CCE-to-REG mapping that indicates a REG bundle corresponding to the CCE and use the CCE-to-REG mapping to identify the REGs for the WTRU. Depending on whether the CCE-to-REG mapping is interleaving or noninterleaving, the CCE-to-REG mapping may be based on different parameters. If the CCE-to-REG mapping is interleaving, the CCE-to-REG mapping may be based on an index associated with the CCE and a number of REGs in the REG bundle. If the CCE-to-REG mapping is noninterleaving, the CCE-to-REG mapping may be based on an index of the CCE.

The network node may determine the CCE-to-REG mapping. The network node may identify a control resource set. The control resource set may include one or more REGs. These REGs may be bundled in one or more REG bundles. The network node may determine which and how many REGs are to be included in one or more of the REG bundles based on the number of REGs in the REG bundle and a number of REGs in the control resource set. The network node may assemble the REG bundles based on the determination. Using the REG bundles, the network node may determine the CCE-to-REG mapping. The network node may use different parameters to determine the CCE-to-REG mapping depending on whether the CCE-to-REG mapping is interleaving or noninterleaving. If the CCE-to-REG mapping is interleaving, the CCE-to-REG mapping may be based on the index associated with the CCE and the number of REGs in the REG bundle. The CCE-to-REG mapping may also be based on a number of OFDM symbols in the control resource set, Whether the CCE-to-REG mapping is interleaving or noninterleaving may be configured by a higher layer. The interleaving may use a modulo-operation interleaver that comprise a multiplying factor. The multiplying factor may be a function of a size of the control resource set. The network node may determine a CCE-to-PDCCH mapping using consecutive CCEs. The control resource set may include one or more OFDM symbols. Either a same interleaver is used for the one or more OFDM symbols, or different interleaver may be used for different OFDM symbols. The network node may send a PDCCH transmission using the CCE-to-REG mapping.

BRIEF DESCRIPTION OF THE DRAWINGS

FIG. 11B shows an example of two-stage search space with the use of virtual indices for lower aggregation levels.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
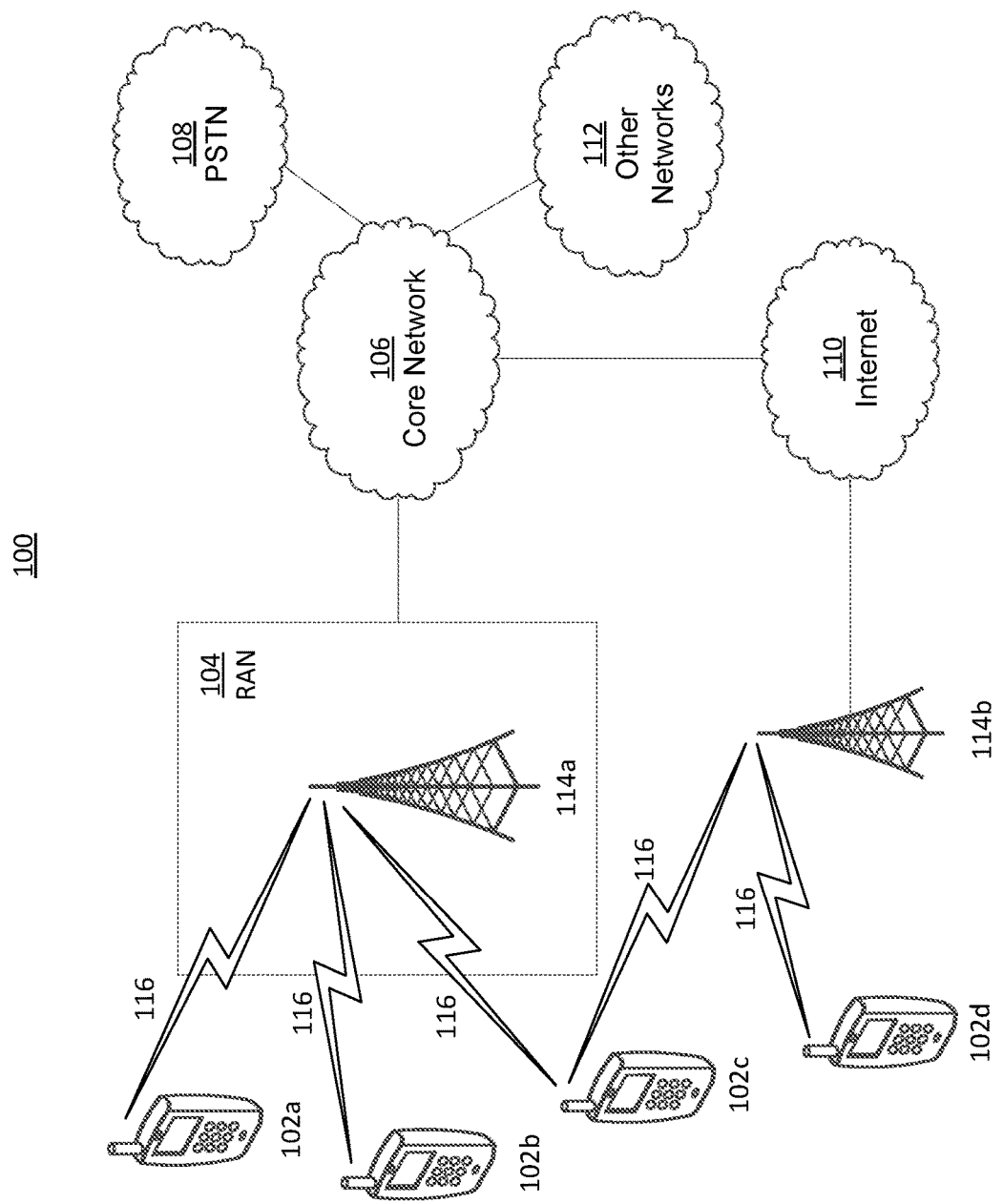
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
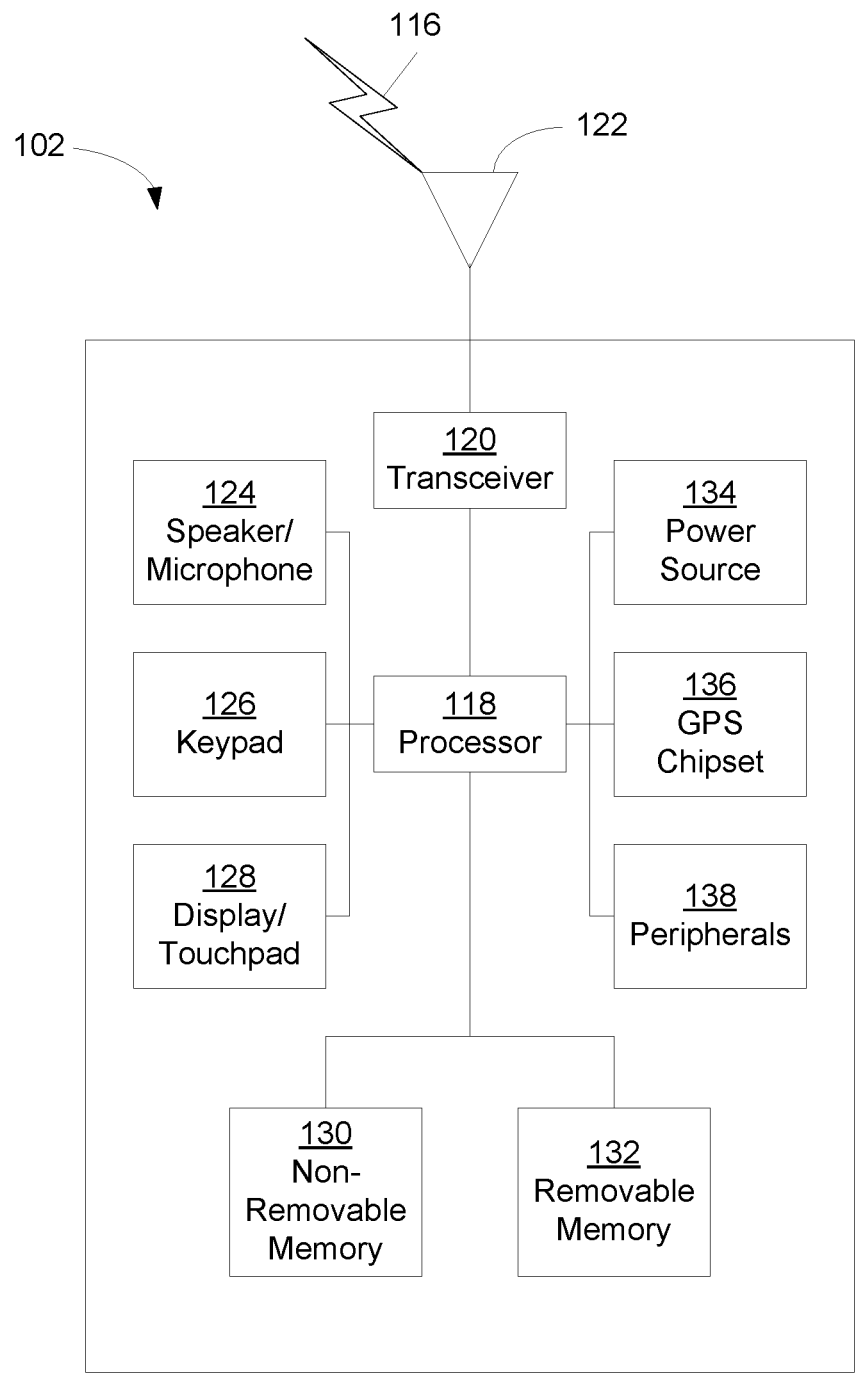
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
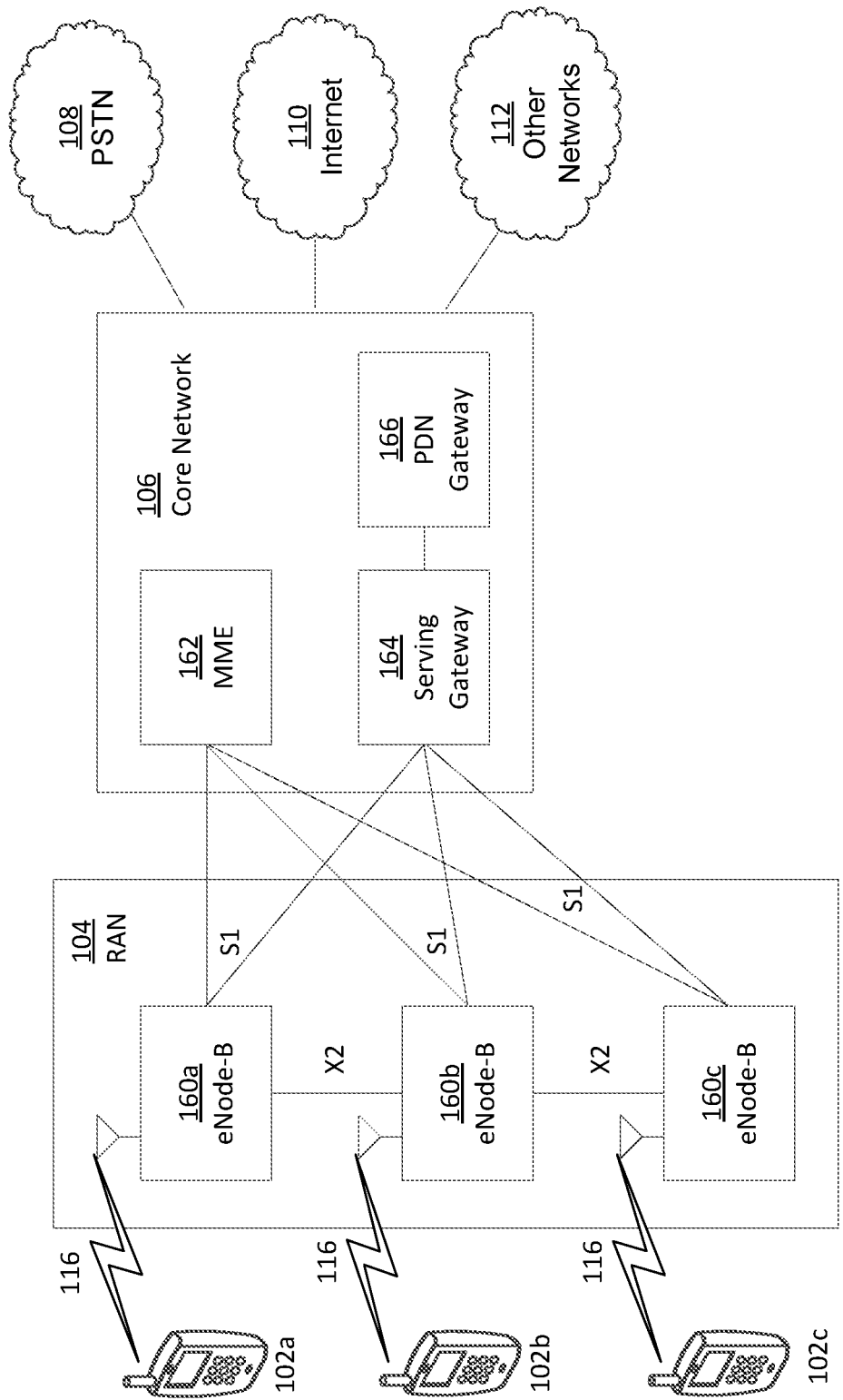
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
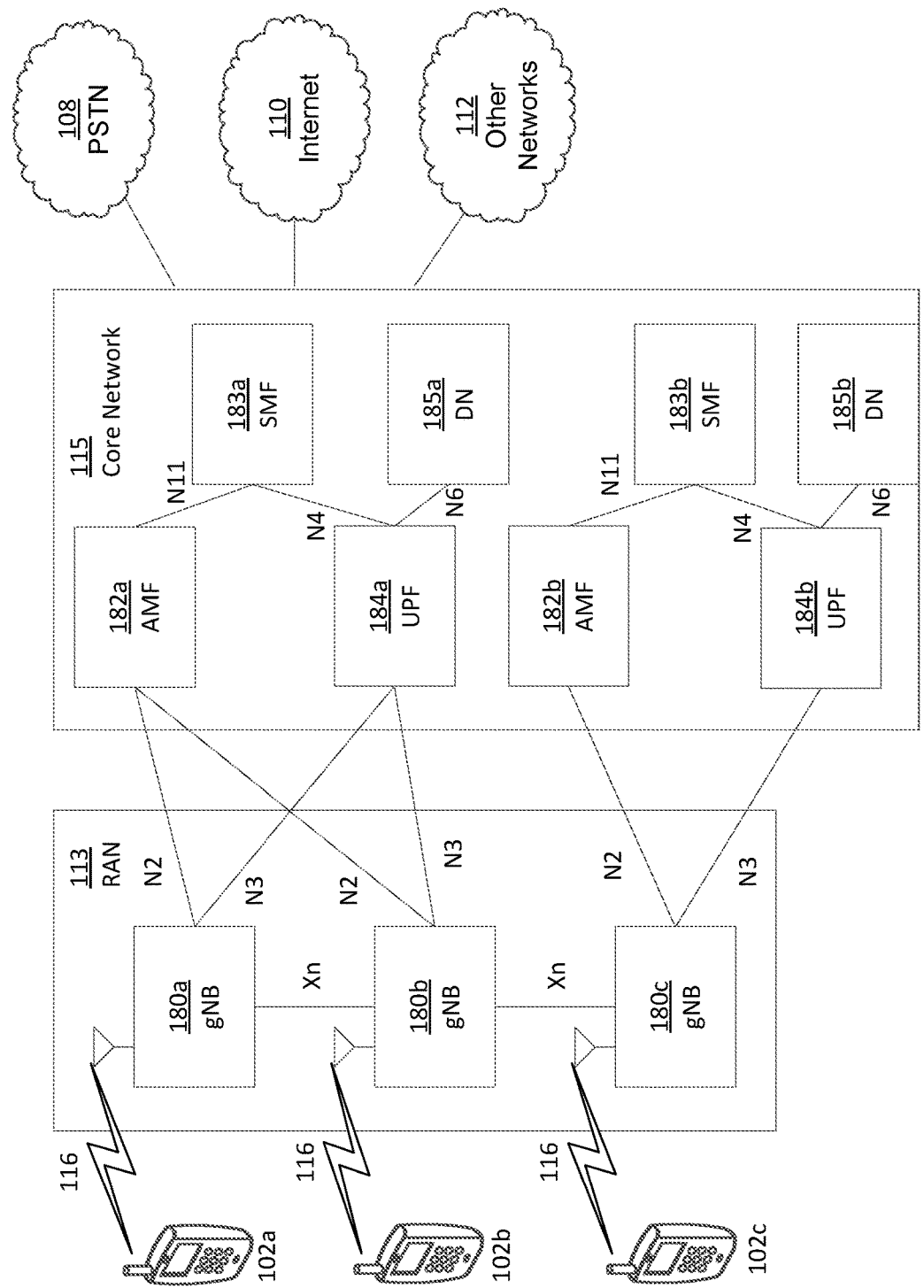
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

A wireless transmit/receive unit (WTRU) may receive a PDCCH transmission comprising a control channel element (CCE) that is mapped to one or more resource element groups (REGs) based on a CCE-to-REG mapping. The WTRU may receive the CCE-to-REG mapping that indicates a REG bundle corresponding to the CCE and use the CCE-to-REG mapping to identify the REGs for the WTRU. Depending on whether the CCE-to-REG mapping is interleaving or noninterleaving, the CCE-to-REG mapping may be based on different parameters. If the CCE-to-REG mapping is interleaving, the CCE-to-REG mapping may be based on an index associated with the CCE and a number of REGs in the REG bundle. If the CCE-to-REG mapping is noninterleaving, the CCE-to-REG mapping may be based on an index of the CCE.

The network node may determine the CCE-to-REG mapping. The network node may identify a control resource set. The control resource set may include one or more REGs. These REGs may be bundled in one or more REG bundles. The network node may determine which and how many REGs are to be included in one or more of the REG bundles based on the number of REGs in the REG bundle and a number of REGs in the control resource set. The network node may assemble the REG bundles based on the determination. Using the REG bundles, the network node may determine the CCE-to-REG mapping. The network node may use different parameters to determine the CCE-to-REG mapping depending on whether the CCE-to-REG mapping is interleaving or noninterleaving. If the CCE-to-REG mapping is interleaving, the CCE-to-REG mapping may be based on the index associated with the CCE and the number of REGs in the REG bundle. The CCE-to-REG mapping may also be based on a number of OFDM symbols in the control resource set. Whether the CCE-to-REG mapping is interleaving or noninterleaving may be configured by a higher layer. The interleaving may use a modulo-operation interleaver that comprise a multiplying factor. The multiplying factor may be a function of a size of the control resource set. The network node may determine a CCE-to-PDCCH mapping using consecutive CCEs. The control resource set may include one or more OFDM symbols. Either a same interleaver is used for the one or more OFDM symbols, or different interleaver may be used for different OFDM symbols. The network node may send a PDCCH transmission using the CCE-to-REG mapping.

A reference symbol may include a symbol such as a complex number that may be fixed and known and used as a pilot. A reference signal(s) may be used to denote a time domain signal that may be generated after processing the reference symbol(s). For example, in orthogonal frequency-division multiplexing (OFDM), reference symbols may be the complex numbers that may be fed into an inverse discrete fourier transform (IDFT) block. A reference signal (s) may be the output of the IDFT block. A resource element(s) (RE) may include an OFDM symbol on a subcarrier, and a resource element group (REG) may include a group of REs used as building blocks of a control channel element (CCE) that may assign resource elements to a user. NR-REG, NR-CCE, and NR-PDCCH may refer to REG, CCE, and physical downlink control channel (PDCCH) for the new radio (NR). NR may include radio technology deployed in 5G and/or beyond. However, the technologies described herein may also apply to radio technology deployed prior to 5G. Also, WTRU and user may be used interchangeably herein.

Downlink control information (DCI) may be sent over a set of communication resources such as a PDCCH. A WTRU may be associated with a set of one or more NR-PDCCH candidates. A PDCCH candidate may be a PDCCH that may be scheduled by a gNodeB for the WTRU. The WTRU may or may be configured to monitor the PDCCH candidate for possible PDCCH transmissions. A set of NR-PDCCH candidates assigned to a WTRU may be associated with a search space. The search space corresponding to a WTRU may be determined by Radio Network Temporary Identifier (RNTI) or other mechanisms that may identify the WTRU inside a cell or differentiate the WTRU from other WTRUs. A choice of a candidate among the candidates of a search space may be performed by an eNodeB/gNodeB. A PDCCH candidate may include CCEs. A CCE may include a number of REGs. PDCCH as used herein may refer to NR-PDCCH.

Figure 2:
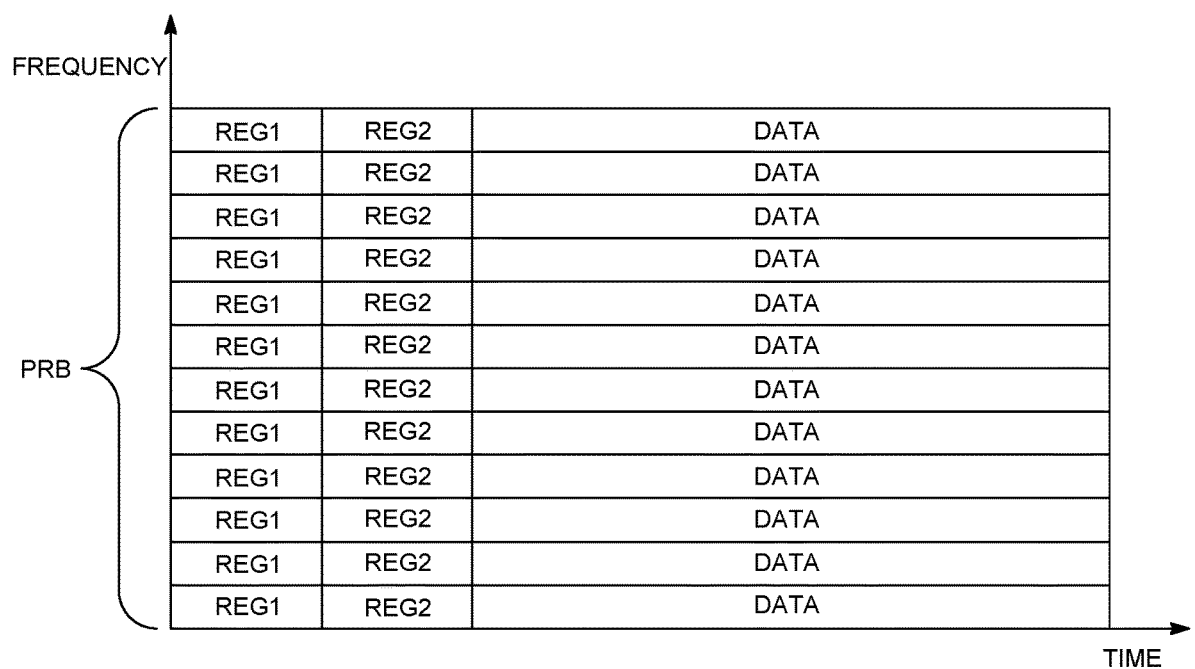
FIG. 2 shows example mapping of resource element groups (REGs) to orthogonal frequency-division multiplex (OFDM) symbols of a resource block (RB).

FIG. 2 shows example mapping of REGs to OFDM symbols of a resource block (RB). An NR-REG may include a set of REs. For example, an REG may be or may include a set of corresponding OFDM symbols on the frequency tones of an RB. As shown in FIG. 2, an REG may be the set of the first OFDM symbols of an RB. An REG may be the set of second symbols of an RB.

Figure 3:
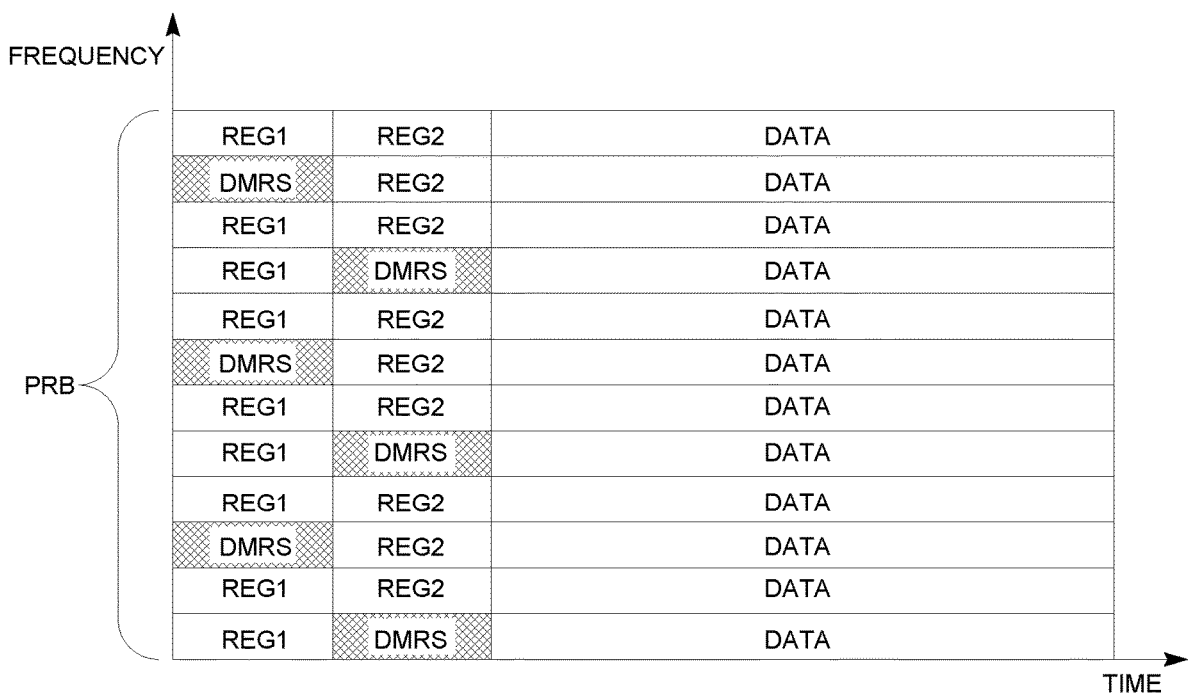
FIG. 3 illustrates an example of the two cases of demodulation reference signal (DMRS) locations inside REGs. DMRS may be located inside all or a subset of REGs.
Figure 3:
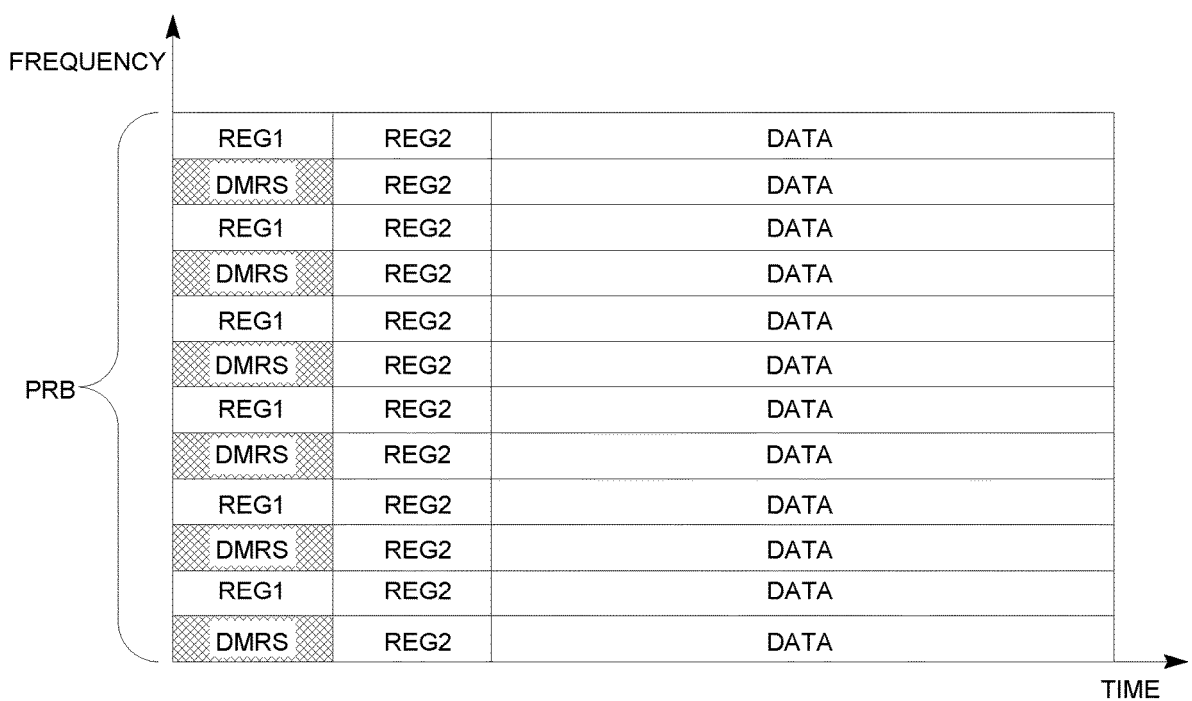

An REG may or may not include reference signal (RS) or demodulation reference signal (DMRS). In the case that an REG does not include resources for DMRS and only contains control information, DMRS in other REGs of the PDCCH may be used as reference signal or demodulation reference signal. An example of two cases of DMRS locations inside REGs is shown in FIG. 3. The positions of the DMRS inside corresponding REGs may be the same or different among different REGs. For example, DMRS locations may depend on the OFDM symbol corresponding to the REG (as the upper example in FIG. 3). DMRS locations may depend on the RNTI of the WTRU or the cell ID.

FIG. 3 illustrates an example of the two cases of DMRS locations inside REGs. DMRS may be located inside all or a subset of REGs. In the case that a transmission of PDCCH uses multiple antenna ports, DMRS corresponding to a WTRU may be divided to subsets that each correspond to an antenna port of gNodeB. For example, if two antenna ports are used at gNodeB for PDCCH transmissions, the resource elements reserved for DMRS may be divided to two subsets. For example, as shown in FIG. 3, DMRS symbols (e.g., consecutive DMRS symbols) may alternate between antenna ports. In FIG. 3, every other DMRS resource element may be included in one of the two subsets corresponding to the two antenna ports.

For multiple (e.g., two) REGs that are adjacent in time, RS aggregation may be used. RS aggregation may utilize one or more (e.g., all) DMRS inside the two REGs together, for example, to improve the channel estimation quality.

Figure 4:
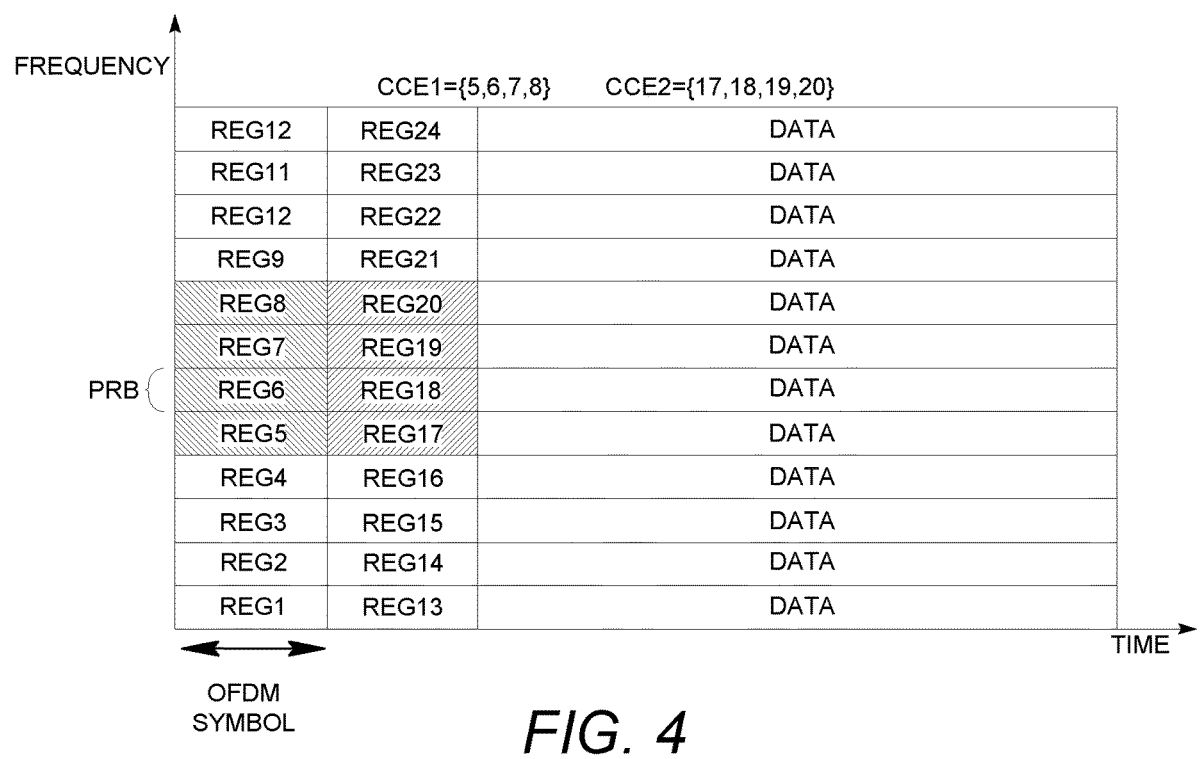
FIG. 4 shows an example of mapping control channel elements (CCEs) to REGs.

NR-CCEs may be mapped to REGs. FIG. 4 shows an example of mapping CCEs to REGs. As shown, a CCE may include a number of REGs. As an example, the CCEs may have a fixed number of REGs (e.g., 4), as shown in FIG. 4. The REGs of a CCE may be locally allocated (e.g., be adjacent in time or frequency), or be distributed. REGs of a CCE may be on the same OFDM symbol or on different OFDM symbols. An example is shown in FIG. 4, where REGs of CCE1 are on the first OFDM symbol of the time slot, and REGs of CCE2 are on the second OFDM symbol.

Each PDCCH candidate may include one or more CCEs. Mapping REGs to CCEs and mapping of CCEs to PDCCH candidates may include various options. For example, mapping of REGs to CCEs may be localized, distributed, or a hybrid of localized and distributed. A time-first REG to CCE mapping may be followed by a time-first CCE to PDCCH candidate mapping or a frequency-first CCE to PDCCH candidate mapping. A frequency-first REG to CCE mapping may be followed by a time-first CCE to PDCCH candidate mapping or a frequency-first CCE to PDCCH candidate mapping. The various options of REG to CCE and CCE to candidate mappings may include one or more of the following example options shown in Table 1.

TABLE 1

| | Example options for REG to CCE and CCE to candidate mappings | | | |
|---|---|---|---|---|
| | Time-first REG to CCE, Time-first CCE to candidate | Time-first REG to CCE, Frequency-first CCE to candidate | Frequency-first REG to CCE, Time-first CCE to candidate | Frequency-first REG to CCE, Frequency-first CCE to candidate |
| Localized (e.g., localized only) mapping of REG-to-CCE | May essentially not be possible (e.g., all the available symbols in the control region may be filled after assigning REGs to CCEs) | Adjacent REGs in time and/or frequency may be assigned to a CCE for both localized and distributed candidates. REGs with and without RS may be in the CCE. | A CCE may be on one symbol across several PRBs. Aggregation may be (e.g., need to be) in time. Adjacent CCEs in time belonging to a same candidate may help (e.g., need to help) RS aggregation. Distributed CCE to candidate mapping may be almost impossible. | RS aggregation may not be possible. Beam switching may be possible. |
| Localized and distributed REG-to-CCE mapping | May essentially not be possible | May essentially become like below | A CCE may be on one symbol across several PRBs. Aggregation may be in time. Adjacent CCEs in time belonging to a same candidate may help RS aggregation, but may not be flexible for all aggregation levels. | RS aggregation may not be possible. Beam switching may be possible. |
| localized or hybrid REG-to-CCE mapping (localized REG pairs with distributed or localized mapping to CCE) | May essentially not be possible | Adjacent REGs in time may be assigned to a CCE for both localized and distributed candidates. For distributed candidates, REGs of a CCE may not be adjacent in frequency. REGs with and without RS may be in the CCE (for example, only the first REG of the CCE may have a RS) | A CCE may be on one symbol across several PRBs. Aggregation may be in time. Adjacent CCEs in time belonging to a same candidate may help RS aggregation. Distribution may be limited. | RS aggregation may not be possible. Beam switching may be possible. |

A time-first REG to CCE mapping and a time-first CCE to candidate mapping may include first assigning REGs in time to one or more CCEs. The REGs may be assigned to the one or more CCEs on different OFDM symbols and on same frequency tones. The CCEs may be assigned in time to one or more PDCCH candidates. For example, the CCEs may be assigned to the one or more PDCCH candidates on different OFDM symbols and on the same frequency tones. The CCEs may be assigned to different frequency tones (e.g., after running out of available OFDM symbols). A time-first REG to CCE mapping and a time-first CCE to candidate mapping may not be possible in practice. For example, the available symbols in the control region may be filled after assigning REGs to CCEs.

A time-first REG to CCE mapping and a frequency-first CCE to candidate mapping may include first assigning REGs in time to one or more CCEs. The REGs may be assigned to the one or more CCEs on different OFDM symbols and on same frequency tones. One or more REGs may be assigned on different frequency tones (e.g., after running out of available OFDM symbols). The CCEs may be assigned to one or more PDCCH candidates on different frequency tones. A time-first REG to CCE mapping and a frequency-first CCE to candidate mapping may have two options: only include a localized mapping of REG to CCE or include both localized and non-localized (e.g., distributed or hybrid) REG to CCE mappings. For example, a hybrid REG to CCE mapping may include localized REG pairs with a distributed or localized mapping to CCEs. Adjacent REGs in time and/or frequency may be assigned to a CCE for localized and/or distributed candidates. REGs with or without RS may be in the CCE.

A frequency-first REG to CCE mapping and a time-first CCE to candidate mapping may include first assigning REGs in frequency to one or more CCEs. The REGs may be assigned to the one or more CCEs on a same OFDM symbol and on different frequency tones. The one or more CCEs may be assigned to one or more PDCCH candidates on different OFDM symbols and on a same frequency tone. A frequency-first REG to CCE mapping and a time-first CCE to candidate mapping may have different variations. For example, a frequency-first REG to CCE mapping and a time-first CCE to candidate mapping may only include localized mapping of REG to CCE. As another example, a frequency-first REG to CCE mapping and a time-first CCE to candidate mapping may include both localized and distributed or both localized and hybrid mappings of REG to CCE. In a frequency-first REG to CCE mapping and a time-first CCE to candidate mapping, a CCE may be on one symbol across one or more PRBs. RS aggregation may be in the time domain among different CCEs of the same PDCCH candidate. Adjacent CCEs in time that belong to the same candidate may assist in RS aggregation.

A frequency first REG to CCE mapping and a frequency first CCE to candidate mapping may include first assigning REGs in frequency to one or more CCEs. The REGs may be assigned to the one or more CCEs on a same OFDM symbol and on different frequency tones. The one or more CCEs may be assigned to one or more PDCCH candidates on the same OFDM symbol and on different frequency tones. A frequency first REG to CCE mapping and a frequency first CCE to candidate mapping may have different variations. For example, a frequency first REG to CCE mapping and a frequency first CCE to candidate mapping may include localized mapping of REG to CCE. As another example, a frequency first REG to CCE mapping and a frequency first CCE to candidate mapping may include both localized and distributed or both localized and hybrid mappings of REG to CCE. A frequency first REG to CCE mapping and a frequency first CCE to candidate mapping may not include RS aggregation. A frequency first REG to CCE mapping and a frequency first CCE to candidate mapping may be utilized along with beam switching.

In frequency-first REG to CCE and frequency-first CCE to candidate mappings, REGs on a same corresponding symbol of different PRBs may be mapped to a (e.g., one) CCE. In frequency-first REG to CCE and frequency-first CCE to candidate mappings, one or more CCEs on the same corresponding symbols (e.g., all on the first symbols of slots, or all on the second symbols of slots) may be grouped to form a PDCCH candidate. In frequency-first REG to CCE and frequency-first CCE to candidate mappings, RS aggregation in time may not be possible. In frequency-first REG to CCE and frequency-first CCE to candidate mappings, beam switching may be possible.

Figure 5:
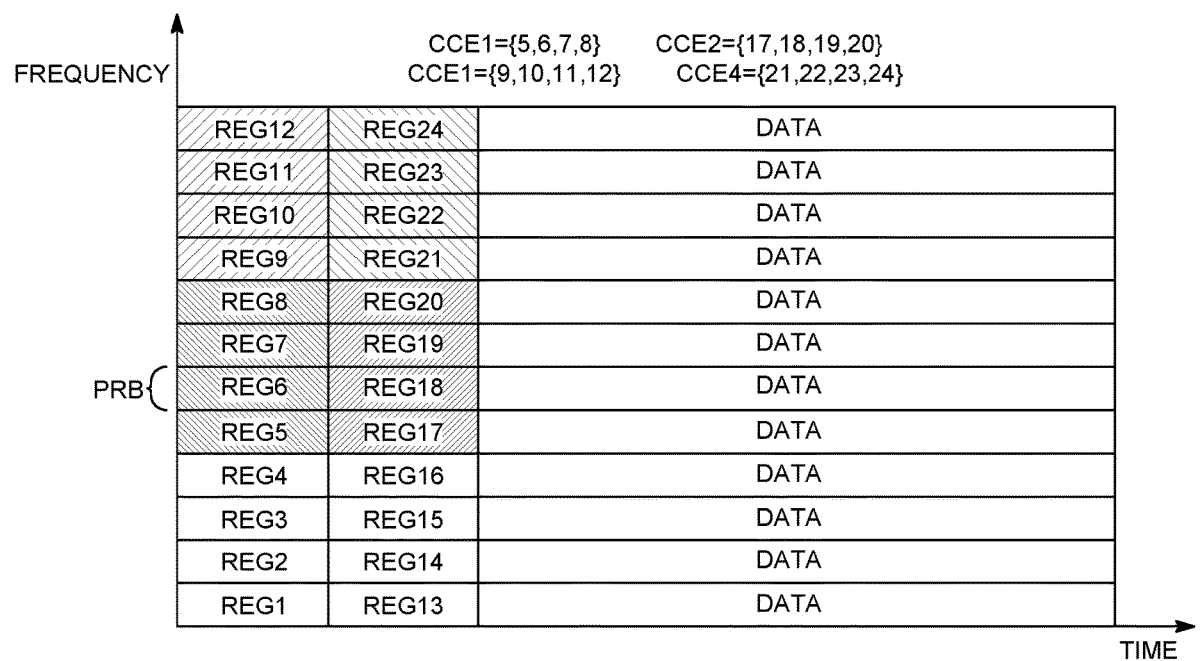
FIG. 5 shows an example of frequency-first REG to CCE and time-first CCE to candidate mappings.

FIG. 5 shows an example of frequency-first REG to CCE and time-first CCE to candidate mappings. As shown in FIG. 5, {CCE1, CCE2} or {CCE3, CCE4} may be a PDCCH candidate with aggregation level of 2. Together {CCE1, CCE2, CCE3, CCE4} may be a PDCCH candidate with aggregation level of 4. In frequency-first REG to CCE and time-first CCE to candidate mappings, REGs on the same OFDM symbol (and on different PRBs) may be mapped to a CCE (e.g., as shown in FIG. 5). In frequency-first REG to CCE and time-first CCE to candidate mappings, RS aggregation (e.g., to improve the quality of a channel estimation) may be performed together with CCE aggregation.

In time-first REG to CCE and frequency-first CCE to candidate mappings, adjacent REGs in time may be assigned to a CCE (e.g., for both localized and distributed candidates). Distributed PDCCH candidates may have distributed mapping of CCEs to the PDCCH candidate(s) with either localized REG-to-CCE mapping or a hybrid REG-to-CCE mapping (e.g., localized in time and distributed in frequency).

Figure 6:
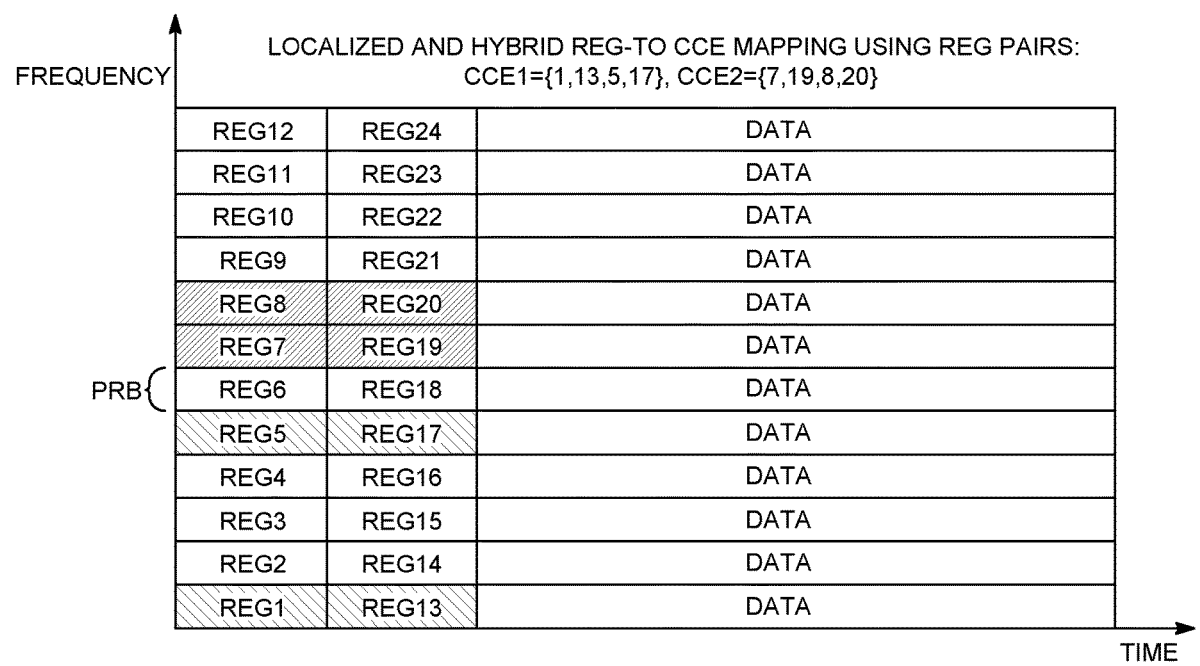
FIG. 6 shows an example of time-first REG to CCE mapping for localized and hybrid CCEs.

FIG. 6 shows an example of time-first REG to CCE mapping for localized and hybrid CCEs. In the example shown in FIG. 6, each CCE may include two REG pairs where each REG pair is adjacent in time. In REG-to-CCE mappings based on REG pairs and hybrid localized-distributed mappings, each CCE may be divided into REG pairs that are adjacent in time. Channel estimation for each REG pair may be performed together (e.g., to improve the quality of channel estimation). A REG pair may be a mixture of REGs with and without RS. A REG pair may have REGs with different RS densities.

Figure 7:
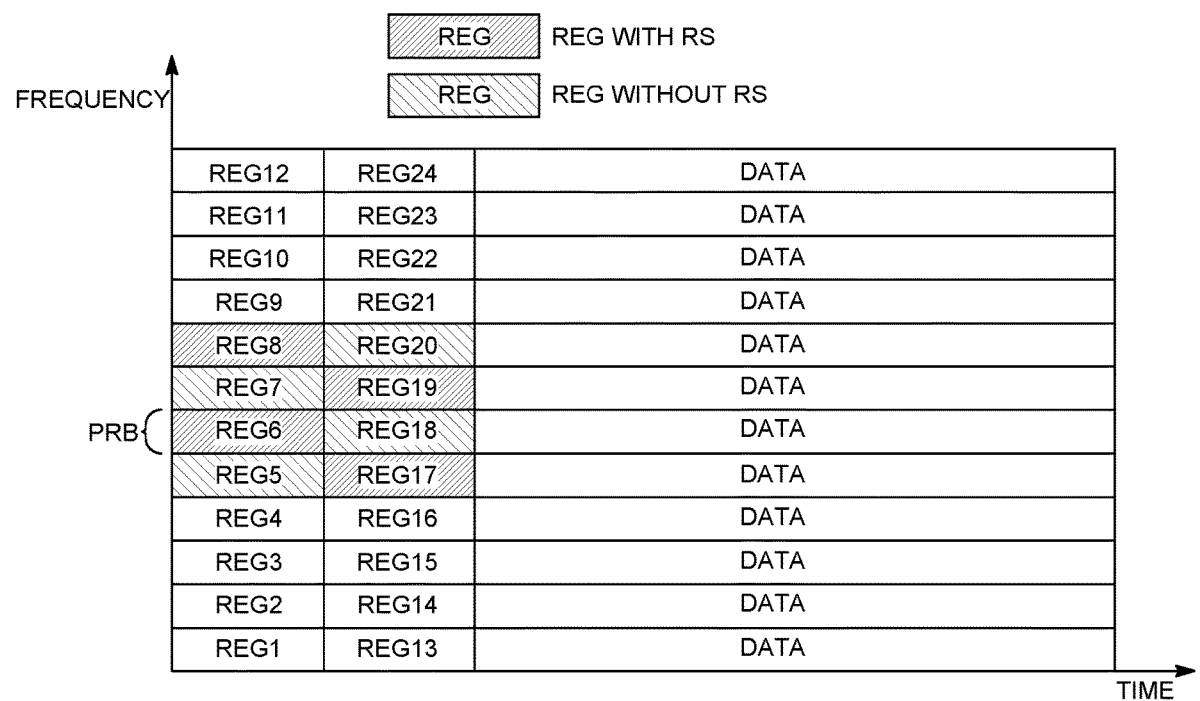
FIG. 7 shows an example reference signal (RS) arrangement that depends on a physical resource block (PRB) number.

FIG. 7 shows an example RS arrangement that depends on a PRB number. The position of REGs with RS (or DMRS) may be dependent on the PRB number. The position of REGs without RS (or DMRS) may be dependent on the PRB number. For example, a RS may be on the first REG of an REG pair if the PRB number is odd. A RS may be on the second REG of an REG pair if the PRB number is even. The RS arrangement may depend on the PRB number for both localized and distributed PDCCH candidates.

Figure 8A:
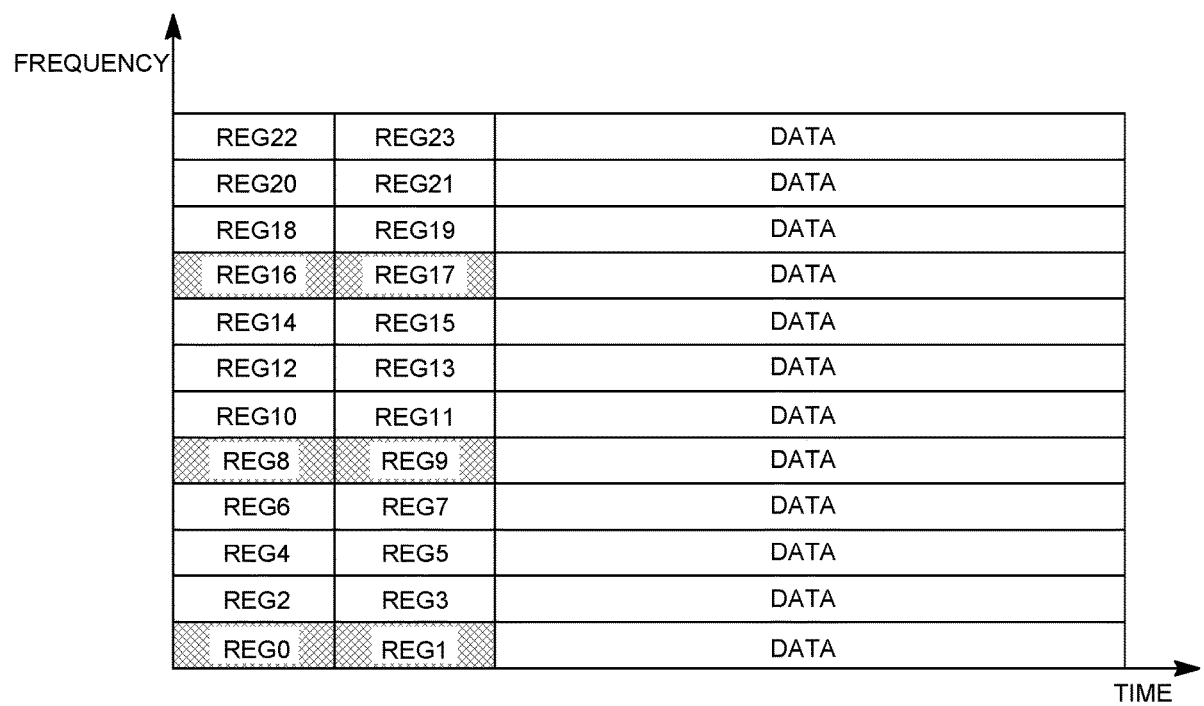
FIGS. 8A and 8B show an example REG bundling.
Figure 8B:
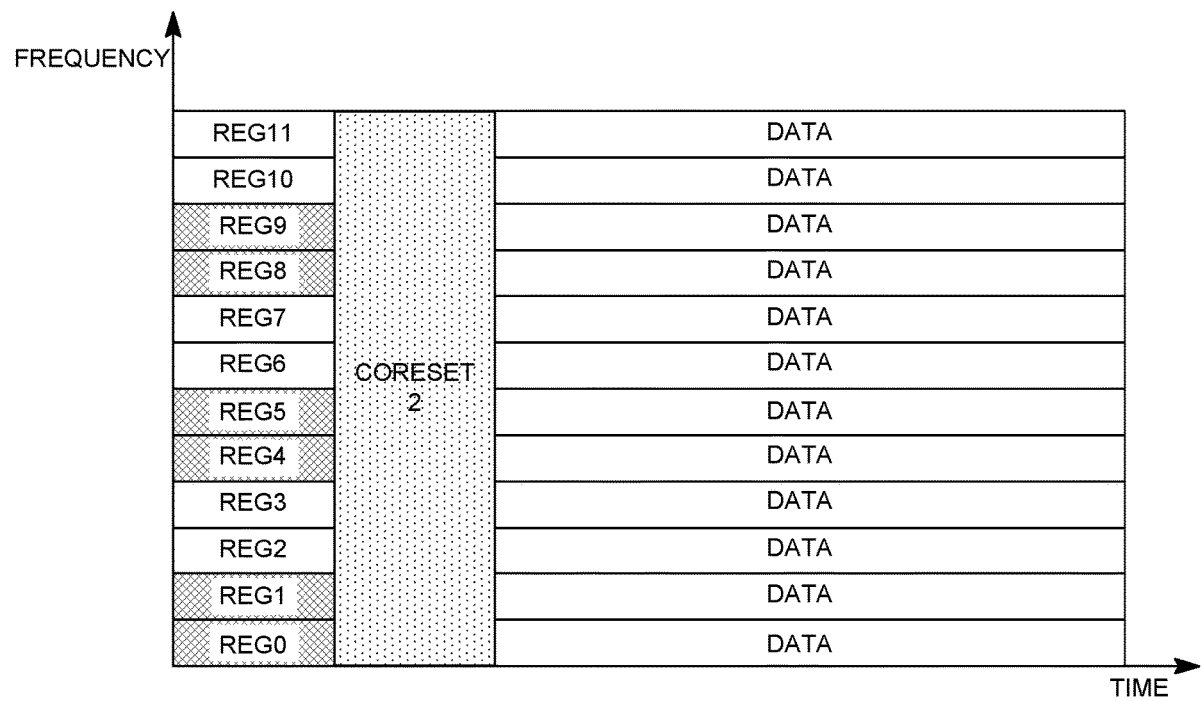

One or more REGs may be assembled (e.g., bundled) in a REG bundle. FIGS. 8A and 8B may show an example REG bundling. FIG. 8A may show an example REG bundling in time. FIG. 8B may show an example REG bundling in frequency. As shown in FIGS. 8A and 8B, the example REG bundling may be performed in time or frequency for a distributed CCE(s) of size 6. For example, the size of the CCE may include the number of REGs in the CCE. As shown in FIG. 8A, REG0, REG1, REG8, REG9, REG16, and REG17 may be included in a distributed CCE. As shown in FIG. 8B, REG0, REG1, REG4, REG5, REG8, and REG9 may be included in a distributed CCE.

A REG bundle may include a number of REGs (e.g., a size of the REG bundle). Two or more adjacent REGs in time and/or frequency may be bundled together. As shown in FIGS. 8A and 8B, two adjacent REGs in time and/or frequency may be bundled together. For example, in FIG. 8A, REG 16 and REG 17 that are adjacent in time are bundled together. In FIG. 8B, REG 8 and REG 9 that are adjacent in frequency are bundled together.

When two or more REGs (e.g., adjacent REGs) are bundled together, the two or more REGs' corresponding channel estimation may be performed together. For REGs in a REG bundle, a precoder may be assumed to be the same. For example, the precoder for REG 0 and REG1 may be the same (e.g., as shown in FIGS. 8A and 8B). One or more (e.g., some or all) of the REGs in a REG bundle may include a DMRS. In examples, REGs with DMRS (e.g., all REGs with DMRS) may have the same DMRS density. For example, the REGs with DMRS (e.g., all REGs with DMRS) may have a DMRS density of ⅓ or ¼. For the DMRS density of ⅓, a DMRS may be used for ⅓ of resource elements (REs) of an REG. In an example, if each REG has 12 REs, ⅓ of the 12 REs (i.e. 4 REs in every REG) may use a DMRS.

REG bundles in a control resource set (CORESET) may be similar. For example, the REG bundles in a CORESET may have a same number of REGs and/or a similar REG bundle mapping. The REG bundle mapping for REG bundles in a CORESET may be (e.g., all) time-first or frequency-first.

The REG to CCE mapping may be the same for a CORESET (e.g., an entire CORESET).

A size of a REG bundle or REG bundle size may describe a number of REGs in the REG bundle. For example, a REG bundle may have a size of 2, 3, or 6, which may correspond to the REG bundle having 2, 3, or 6 REGs. A REG bundle (e.g., REG bundle size and type) may be configured for a control resource set. For example, a REG bundle size of 6 may be used for a localized PDCCH (e.g., a non-interleaved REG to CCE mapping). A REG bundle size of 2 or 3 may be used for a distributed PDCCH (e.g., an interleaved REG to CCE mapping). The REG bundle size may be configured per CORESET (e.g., a REG bundle size for a particular CORESET may be based on a size of the particular CORESET).

The REG bundle mapping for REG bundles in a CORESET may be based on a configuration of the CORESET (e.g., a size of the CORESET). The size of the CORESET may include the number of OFDM symbols in the CORESET. When a CORESET covers an (e.g., only one) OFDM symbol, the REG bundles in the CORESET may be bundled in frequency (e.g., frequency-first). For example, REGs that are adjacent in frequency may be bundled. When a CORESET spans multiple OFDM symbols (e.g., 2 or 3), the REG bundles in the CORESET may be time-first REG bundled or frequency-first REG bundled. A frequency-first REG bundling (e.g., for a CORESET that spans multiple symbols) may be used for having PDCCH candidates over multiple beams. The time-first REG bundling may be used (e.g., preferred) for the REG bundles with a bundle size that is equal to or a multiplier of the size of the CORESET (e.g., the length of the CORESET in time). With the time-first REG bundling, putting DMRS on the one or more REGs of the bundle that are on the first OFDM symbol may enable channel estimation for the whole REG bundle (e.g., by a receiving entity).

A REG bundle may have one of following types. REG bundles in a CORESET may have the same type. For example, each REG bundle in a CORESET may have the same type. For a REG bundle of size 2, bundled in time, the first REG may have a DMRS(s) and the second REG may or may not have a DMRS(s). For an REG bundle of size 3, bundled in time, the first REG may have a DMRS(s) and the second and/or third REG may or may not have a DMRS(s). For an REG bundle of size 2, bundled in frequency, the (e.g., all) REGs in the REG bundle may have a DMRS(s). For an REG bundle of size 3, bundled in frequency, the (e.g., all) REGs in the REG bundle may have a DMRS(s). For an REG bundle of size 6, bundled in frequency, the (e.g., all) REGs in the REG bundle may have a DMRS(s). For an REG bundle of size 6, bundled in a rectangular arrangement with 2 REGs bundled in frequency and 3 REGs bundled in time, the 2 REGs on the first OFDM symbol may have a DMRS(s) and the other REGs of the REG bundle may or may not have a DMRS(s). For an REG bundle of size 6, bundled in rectangular arrangement with 3 REGs bundled in frequency and 2 REGs bundled in time, the 3 REGs on the first OFDM symbol may have a DMRS(s) and the other REGs of the REG bundle may or may not have a DMRS(s).

One or more of REGs, REG bundles, and CCE may be mapped. In an example, REGs, REG bundles, and CCEs may be mapped where each CCE includes 6 REGs and each REG bundle includes 2 REGs. The number of REGs inside a control resource set may be $N_{REG}$. When used herein, "$\lfloor x \rfloor$" may denote the floor function. If $N_{CCE}$ is the number of CCEs in the control resource set and $N_{bundle}$ is the number of REG bundles in the control resource set, then the number of CCEs in the control resource set $N_{CCE}$ may be determined using the function $\lfloor N_{REG}/6 \rfloor$ (e.g., as shown in Eq. 1), and the number of REG bundles in the control resource set $N_{bundle}$ may be determined using the function $\lfloor N_{REG}/2 \rfloor$ (e.g., as shown in Eq. 2). For example, the following equations may be used.

$$N_{CCE} = \lfloor N_{REG}/6 \rfloor \qquad \text{Eq. 1}$$

$$N_{bundle} = \lfloor N_{REG}/2 \rfloor \qquad \text{Eq. 2}$$

The number of CCEs in the control resource set may be determined based on the number of REGs inside the control resource set, $N_{REG}$, and the number of REGs in a CCE, $N_{CCE,REG}$ (e.g., as shown in Eq. 3). The number of REG bundles in the control resource set, $N_{bundle}$, may be determined based on the number of REGs inside the control resource set, $N_{REG}$, and the number of REGs in a REG bundle, $N_{bundle,REG}$ (e.g., as shown in Eq. 4). The number of REG bundles in a CCE, $N_{CCE,bundle}$, may be determined based on the number of REGs in a CCE, $N_{CCE,REG}$, and the number of REGs in a REG bundle, $N_{bundle,REG}$ (e.g., as shown in Eq. 5).

$$N_{CCE} = \lfloor N_{REG}/N_{CCE,REG} \rfloor \qquad \text{Eq. 3}$$

$$N_{bundle} = \lfloor N_{REG}/N_{bundle,REG} \rfloor \qquad \text{Eq. 4}$$

$$N_{CCE,bundle} = \lfloor N_{CCE,REG}/N_{bundle,REG} \rfloor \qquad \text{Eq. 5}$$

The REGs (e.g., the REGs in a REG bundle) may be numbered based on the number of REGs inside a control resource set, $N_{REG}$, (e.g., from 0 to $N_{REG}-1$). For example, when the control resource set covers multiple OFDM symbols, the REGs may be first numbered (e.g., consecutively) in time and then (e.g., consecutively) in frequency. When the control resource set covers one (e.g., only one) OFDM symbol, the REGs may be numbered from 0 to $N_{REG}-1$, for example, consecutively in frequency.

A REG bundle may be numbered based on the number of REG bundles in the control resource set, $N_{bundle}$, (e.g., from 0 to $N_{bundle}-1$). A CCE may be numbered based on the number of CCEs in the control resource set, $N_{CCE}$, (e.g., from 0 to $N_{CCE}-1$).

REGs may be numbered based on an index and the number of REGs in a REG bundle, $N_{bundle,REG}$. For example, REGs that are numbered $N_{bundle,REG}$ k, $N_{bundle,REG}$ k+1, . . . , $N_{bundle,REG}$ k+$N_{bundle,REG}-1$ may form the REG bundle with index k. In an example, REGs that are numbered 2k and 2k+1 may form the REG bundle with index k.

A PDCCH may use different transmission modes, for example, a localized or distributed transmission. A localized transmission and a distributed transmission may be associated with different mappings of CCEs to REGs and/or CCEs to REG bundles. A localized transmission may correspond to non-interleaving mappings of CCEs to REGs and/or CCEs to REG bundles. A distributed transmission may correspond to interleaving mappings of CCEs to REGs and/or CCEs to REG bundles. For example, a PDCCH candidate(s) (e.g., all PDCCH candidates) in a PDCCH control resource set $X_m$ may use only localized or only distributed transmission. $X_m$ may stand for the $m^{th}$ CORESET. The transmission modes used by the PDCCH may be configured by higher layers.

Within the control resource set, CCE to REG mapping may be based on one or more REG bundles in the control resource set and/or a size of the CORESET. The size of the CORESET may include the number of REG bundles in the control resource set, $N_{bundle}$. The REG bundles may be numbered based on the number of REG bundles in a CCE, $N_{CCE,bundle}$.

For example, for a localized mapping (e.g., a non-interleaved REG to CCE mapping), the CCE numbered n may correspond to REG bundles numbered $nN_{CCE,bundle}+j$, where j=0, 1, . . . , $N_{CCE,bundle}$ within the control resource set. For a distributed mapping (e.g., an interleaved REG to CCE mapping), the CCE numbered n may correspond to REG bundles numbered $(nN_{CCE,bundle}+j)d$ mod $N_{bundle}$ within the control resource set, where j=0, 1, . . . , $N_{CCE,bundle}-1$, and d may be an integer that is used for the interleaving and/or permutation in the distributed mapping. Although the function xd mod $N_{bundle}$ is used in the above example, other function f(x) may be used for interleaving.

NR-PDCCH candidates may be mapped to CCEs. A PDCCH candidate may include one or more CCEs. A number of CCEs in a PDCCH candidate may be referred to as an aggregation level. The number of CCEs in a PDCCH candidate may be a number among a set of positive integer numbers (for example {1, 2, 4, 8, 16}). PDCCH candidates of a search space (e.g., corresponding to a WTRU) may have different or similar aggregation levels. The PDCCH may be selected (e.g., among the candidates inside the search space) based on the required SNR of the WTRU and may avoid coincidence with the chosen PDCCH(s) of other WTRUs. The PDCCH may be selected by the gNodeB and/or another entity.

Figure 9:
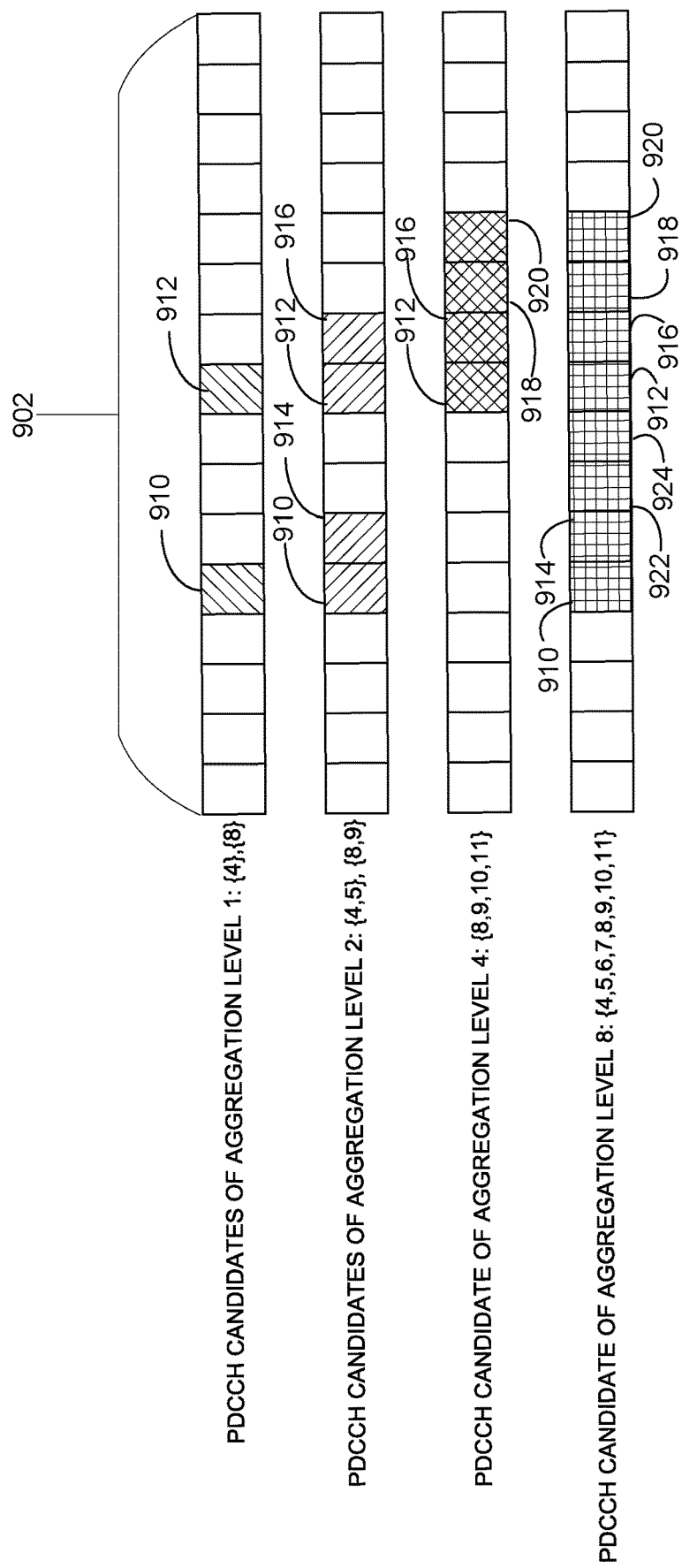
FIG. 9 shows an example hierarchical structure for physical downlink control channel (PDCCH) candidates with different aggregation levels, corresponding to a specific (WTRU).

FIG. 9 shows example hierarchical structure for PDCCH candidates with different aggregation levels, corresponding to a specific WTRU. The PDCCH candidates corresponding to a specific WTRU may have a hierarchical or semi-hierarchical structure, such that a PDCCH candidate with a larger aggregation level may include all or some of CCEs corresponding to PDCCH candidates of smaller aggregation levels (as shown in FIG. 9). As shown in FIG. 9, 902 may be a group of CCEs that include CCEs 910, 912, 914, 916, 918, 920, 922, 924 and other CCEs. The CCEs 910, 912, 914, 916, 918, 920, 922, 924 may be in a position or order of 4, 8, 5, 9, 10, 11, 6, and 7. Among the group of CCEs 902, a PDCCH candidate of aggregation level of 1 may include CCE 910. Another PDCCH candidate of aggregation level of 1 may include CCE 912. A PDCCH candidate of aggregation level of 2 may include CCEs 910 and 914. Another PDCCH candidate of aggregation level of 2 may include CCEs 912 and 916. A PDCCH candidate of aggregation level of 4 may include CCEs 912, 916, 918 and 920. A PDCCH candidate 908 of aggregation level of 8 may include CCEs 910, 914, 922, 924, 912, 916, 918, and 920.

PDCCH candidates may be mapped to CCEs and/or REGs such that the REGs included in a PDCCH candidate may be associated with a same OFDM symbol. For example, a PDCCH candidate may only include REGs on the same OFDM symbol. A WTRU may receive information about the OFDM symbol corresponding to a PDCCH associated with the WTRU, and may search for the PDCCH based on the received information. If the WTRU receives information about the OFDM symbol corresponding to a PDCCH associated with the WTRU, the WTRU may reduce effective search space for the WTRU (e.g., by so doing, the WTRU may reduce complexity of blind detection of the PDCCH). This information may be communicated using common physical control channel (e.g., common PDCCH) and/or other mechanisms.

PDCCH candidates may be mapped to CCEs for interleaved and non-interleaved cases. For a localized PDCCH (e.g., corresponding to a non-interleaved case), adjacent CCEs may be assigned to a PDCCH. For a distributed PDCCH (e.g., corresponding to an interleaved case), the CCEs may be dispersed in the CORESET.

A mapping of localized and distributed CCEs to a PDCCH candidate may be based on REG bundles). Localized and distributed CCEs may be mapped to the PDCCH candidate by relying on the mapping of the REG bundles to CCEs (e.g., for both cases of interleaved and non-interleaved REG bundles). For example, CCEs with consecutive numbers may be assigned to a PDCCH. If the mapping of REG bundles to CCEs is non-interleaved, adjacent REG bundles with consecutive numbers may be mapped to CCEs. CCEs with consecutive indices (e.g., CCEs with indices j and j+1) may become adjacent to each other. Assigning CCEs with consecutive numbers may result in a localized (e.g., non-interleaved) PDCCH candidate. If the mapping of REG bundles to CCEs is interleaved, consecutive CCEs (e.g., CCEs with consecutive indices) may not be adjacent to each other and/or be far from each other. A mapping of CCEs to a PDCCH candidate described herein, for the case of 6 REGs per CCE may be based on the following.

In the example where a CCE has 6 REGs (e.g., as described herein), mapping of REGs to CCEs may include one or more of the following. A REG bundle may be defined based an index and/or the REG bundle size. CCE may include REG bundles that are determined based on a number of REGs in a corresponding REG bundle and an index of the CCE. For example, CCE j may include REG bundles of {f(i), (f(i+1)), . . . , f(i+6/$N_{bundle,REG}-1$)}. For the non-interleaved mapping REGs to CCEs, f{x}=x. x may be indes of a REG bundle (e.g., REG bundle i). f{.} is an interleaver, where i=6j/$N_{bundle,REG}$, for example, for interleaved mapping REGs to CCEs. $N_{bundle,REG}$ may be the number of REGs in a REG bundle, which, like L, may the REG bundle size.

Numbered (e.g., indexed or identified) CCEs may be adjacent or not adjacent to each other, e.g., based on whether interleaving or non-interleaving is used. For example, the last REG bundle of CCE 1 and the first REG bundle of CCE 2 may be adjacent if a non-interleaved mapping (e.g., non-interleaved mapping of REGs to CCEs) is used. The last REG bundle of CCE 1 and the first REG bundle of CCE 2 may be far from each other if an interleaved mapping of REGs to CCEs is used. As used herein, "CCE-to-REG mapping" and "REG-to-CCE mapping" may be used interchangeably and the mapping may be constructed using a combination of "REG-to-bundle mapping" (e.g., which may be referred to as "bundle-to REG mapping") and "bundle-to-CCE mapping" (e.g., which may be referred to as "CCE-to-bundle mapping").

A distributed PDCCH(s) may include and/or use a combination of multiple interleavers. For example, the distributed PDCCH(s) may include and/or use two different interleavers such as f(x) and g(x)), where f(x) may permute the indices of REG bundles (e.g., for mapping to CCEs) and g(x) may permute the indices of CCEs (e.g., for mapping to PDCCH candidates).

The interleaver for REG bundles may be a (e.g., any) general function f(x) which maps an index of an REG bundle to another index. For example, the function f(x) may map a logical REG-bundle index to a physical REG-bundle index. An interleaver may include one or more of the following properties (e.g., to support a good distributed PDCCH design(s)). An interleaving function may disperse the REG bundles of a PDCCH candidate across the CORESET, for one or more (e.g., all) aggregation levels. For example, the interleaving function may ensure an appropriate (e.g., good) distribution of REG bundles of the PDCCH candidate across frequency components of the CORESET, for non-contiguous CORESET(s).

An interleaver function may be designed based on a modulo operation (e.g., a modulo operation interleaver). For example, the interleaving function f(x) may map index x to f(x)=d·x mod N, where d and N are natural numbers related to the CORESET. N may be a modulo base and d may be a multiplying factor. For example, the modulo base N may be $N_{bundle}$, which may be the number of REG bundles in the CORESET. The multiplying factor d may be selected such that an overall modulo operation facilitates (e.g., ensures) a good dispersion. For example, a good dispersion may include REG bundles of a PDCCH candidate that are evenly distributed in different parts of the CORESET and/or having largest possible distances among the REG bundles of the PDCCH candidate. One or more of the following may facilitate a good dispersion. The multiplying factor d may be coprime with the modulo base $N_{bundle}$. For example, the multiplying factor d and the modulo base $N_{bundle}$ may not have any common divisor larger than 1. Consecutive indices may not be mapped to indices that are close to each other, for example, to ensure good dispersion even for low aggregation levels. The multiplying factor d may be associated with a lower limit and/or an upper limit. For example, the multiplying factor d may not be too small or too great to the extent that the multiplying factor d approaches (e.g., is similar or close to) the modulo base N.

The multiplying factor d may be specified or configured. For example, the multiplying factor d may be specified as a function of the CORESET size in terms of REG bundles (e.g., the number of REG bundles in the control resource set, $N_{bundle}$). The multiplying factor d may be indicated by a table. The multiplying factor d may be included (e.g., explicitly included) in a CORESET configuration.

Figure 10:
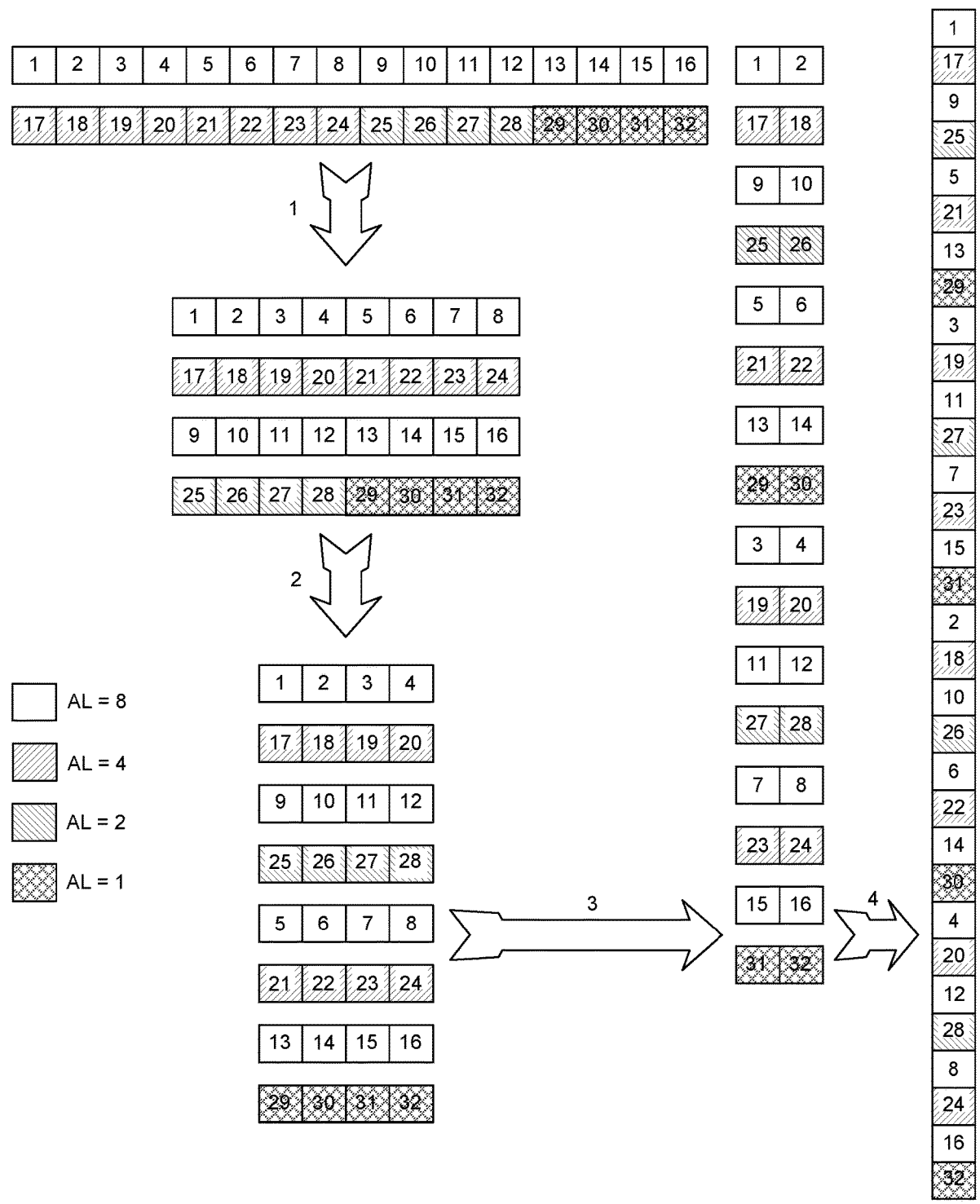
FIG. 10 shows an example interleaver design based on a sub-block interleaving.

REG bundles may be interleaved using a sub-block interleaving approach. FIG. 10 shows an example interleaver design based on a sub-block interleaving. Sub-block interleaving may be an iterative approach, for example, including one or more of the following (e.g., 1, 2, and 3). Sub-block interleaving may start with a row of $N_{bundle}$ REG bundles (e.g., $N_{bundle}$ may be the number of REG bundles in the control resource set). A k×Bl matrix may be transformed (e.g., for each iteration) to a Bk×l matrix. B may be the size of a sub-block. K may be the number of rows, and Bl may be the number of blocks of the matrix before one iteration. For example, the transformation may be achieved by arranging Bk×l matrix's k×l submatrices in a column (e.g., instead of a row). The transformation may be performed iteratively. When no more iteration of this kind can be done (e.g., when a final matrix has only one column), a result may include a column of size $N_{bundle}$. The column of size $N_{bundle}$ may include a mapping (e.g., a final mapping) of logical REG bundles to physical REG bundles. Logical indices of REG bundles may be based on the REG bundles' mapping to CCEs. Physical indices of REG bundles may be based on the REG bundles' physical location(s) in the CORESET. B may vary or B may remain unchanged in each iteration. For example, B may be different for each iteration of a sub-block interleaving. B may be constant (e.g., remain the same for all iterations) for a sub-block interleaving. As shown in the example in FIG. 10, an interleaver design may be based on a sub-block interleaving, when B=2, for the mapping of PDCCH candidates with AL={1, 2, 4, 8} to a CORESET comprising 32 REG bundles. The REG bundles may be associated with an REG bundle size of three REGs.

As shown in FIG. 10, logical REG-bundles (e.g., the original 32 REG-bundles) may be mapped to physical (e.g., 32 physical) REG bundles (e.g., at 4). After 4, each PDCCH candidate irrespective of the PDCCH candidate's aggregation level is well distributed across the frequency components of the CORESET (e.g., evenly distributed in different frequency parts of the CORESET and/or having largest possible distances among REG bundles of a PDCCH candidate). In this example, it may be assumed that one PDCCH candidate has an AL of 2, one PDCCH candidate has an AL of 4, one PDCCH candidate has an AL of 8, and two PDCCH candidates have AL of 1. For the PDCCH candidate with AL=8, the REG bundles may include {1,9,5,13,3,11,7,15,2, 10,6,14,4,12,8,16}. For the PDCCH candidate with AL=4, the REG bundles may include {17,21,19,23,18,22,20,24}. For the PDCCH candidate with AL=2, the REG bundles may include {25,27,26,28}. For the PDCCH candidates with AL=1, REG bundles 29 & 30 may belong to one PDCCH candidate and REG bundles 31 & 32 may belong to another PDCCH candidate.

If the REG bundle indices are from 0 to $2^n$, sub-block interleaving may be performed by reversing n binary digits of a REG bundle index, e.g., mapping the logical REG bundle with index $\overline{b_1 b_2 ... b_n}$ to the physical REG bundle with index $\overline{b_n b_{n-1} ... b_1}$. Sub-block interleaving may scatter (e.g., robustly) REG bundles of a PDCCH candidate across the CORESET and/or may work well for multiple (e.g., all) aggregation levels. A basic sub-block interleaving design may support (e.g., only support) certain sizes of CORESET, for example, CORESET sizes of power of 2. The size of CORESET may be in terms of the number of REG bundles. The interleaving design based on sub-block interleaving may include different values of sub-block partitioning B. The interleaving design based on sub-block interleaving may use a combination and/or concatenation of sub-block interleaving and modulo-operation interleaving (e.g., to make the sub-block interleaving more general). An approach for the combination and/or concatenation of sub-block interleaving and modulo-operation interleaving may include one or more of the following. The approach may include considering $N_{bundle}=N2^n$, where N is an odd number. N may be an arbitrary number. The approach may include mapping a (e.g., each) logical REG bundle index $x2^n+y$ (where $x<N$ and $y<2^n$) to $z2^n+t$, where $z=d$. x mod N, and t may be determined by reversing binary digits of y. x, y, n and t may be selected arbitrarily or randomly.

A WTRU may assume that a common interleaver is used across multiple (e.g., all) OFDM symbols for a CORESET spanning multiple OFDM symbols. A common interleaver for a CORESET may be signaled implicitly. For example, when the WTRU is configured with a multi-symbol CORESET with the time-first REG to REG-bundle mapping, the WTRU may assume that the common interleaver function is used for OFDM symbols (e.g., all OFDM symbols) comprised in the CORESET.

A WTRU may assume that a different interleaver is used for some OFDM symbols (e.g., per OFDM symbol) for a CORESET spanning multiple OFDM symbols. Using a different interleaver for each OFDM symbol may enable time domain precoder cycling for a PDCCH candidate. Using a different interleaver for each OFDM symbol may enable multi-beam operation for a PDCCH candidate in higher frequency bands. A (e.g., each) OFDM symbol may be transmitted on multiple beams. The interleaving function f_i (x) for the OFDM symbol i may map index x to f_i (x)=d_i. x mod N, where d_i and N are natural numbers related to the CORESET. N may be a modulo base. An example for the modulo base N may be determined based on $N=N_{bundle}/N_{ofdm\_CORESET}$ and/or may represent the number of REG bundles within one OFDM symbol of the CORESET, where $N_{ofdm\_CORESET} \in \{1, 2, 3\}$ may denote the number of OFDM symbols comprised in the CORESET. The multiplying factor d_i may be selected such that an overall modulo operation per each OFDM symbol ensures a good dispersion in frequency for the PDCCH candidate. For example, the REG bundles comprised in the PDCCH candidate that spans multiple OFDM symbols may be interleaved such that the REG bundles are not adjacent in frequency.

The use of a different interleaver for a CORESET may be signaled implicitly or explicitly. For example, when a WTRU is configured with a multi-symbol CORESET with a frequency-first REG-to-REG-bundle mapping, the WTRU may implicitly assume that a different interleaver function is used for each OFDM symbol comprised in the CORESET. When the WTRU is configured with a multi-symbol CORESET with a time-first REG-to-REG-bundle mapping, the WTRU may implicitly assume that a same interleaver function is used for the (e.g., all) OFDM symbols comprised in the CORESET. The WTRU may receive an indication that indicates whether the same interleaver is used across multiple OFDM symbols within the CORESET or different interleavers are used for different OFDM symbols comprised in the CORESET. The WTRU may receive the indication explicitly in the DCI or through radio resource control (RRC) signaling (e.g., as a part of a CORESET configuration).

A CORESET may be configured by the master information block (MIB), physical broadcast channel (PBCH) and/or higher layer signaling (e.g., RRC). The configuration of a CORESET by higher layer signaling may include one or more frequency resources of the CORESET, a first OFDM symbol, a time duration (e.g., in terms of number of symbols), a CCE-to-REG mapping (e.g., whether interleaved or non-interleaved), an REG bundle size (e.g., which may be signaled only for the interleaving case), one or more Quasi-co-location (QCL) assumptions for antenna ports, and/or a monitoring periodicity of the CORESET (e.g., default periodicity may be every slot).

One or more frequency resources may be indicated by the CORESET configuration. For example, the CORESET configuration may indicate which resource blocks (RBs) are allocated to the CORESET configuration or the CORESET. A CORESET in frequency may be contiguous or non-contiguous.

A contiguous CORESET may be within one bandwidth part. The CORESET configuration for the contiguous CORESET within one bandwidth part may indicate (e.g., specify) a first and a last RB (e.g., or PRB) of the CORESET. The CORESET configuration for the contiguous CORESET within one bandwidth part may indicate a beginning RB and a length of the CORESET (e.g., in frequency). The granularity (e.g., of frequency) indicated by the CORESET configuration may be in RBs, resource block groups (RBGs), and/or a fraction of the bandwidth part (e.g., granularity of 1/n of the bandwidth part including the CORESET).

A non-contiguous CORESET may include one or more contiguous parts. For example, each contiguous part of a non-contiguous CORESET may correspond to a respective bandwidth part. For example, the frequency configuration of the CORESET may include a combination of frequency configurations for each contiguous part of the CORESET (e.g., in each bandwidth part and/or as described herein).

A non-contiguous CORESET may include a limited number of contiguous parts (e.g., at most 2). The limited number of contiguous parts may or may not be in different bandwidth parts. For example, the frequency configuration of the non-continuous CORESET may include (e.g., the frequency resources of the non-contiguous CORESET may be indicated by) the first and the last RB of the CORESET and the first and the last RB of a gap between the (e.g., two) contiguous parts of the CORESET.

The number of RBs inside a CORESET may be configured such that the total number of REGs is a multiple of the number of REGs in a CCE (e.g., to avoid wasting control resources). For example, if each CCE has 6 REGs and the length of the CORESET in time is two symbols, the number of RBs in the CORESET may be a multiple of 6/2=3. If each CCE has 6 REGs and the length of the CORESET is a single symbol, the number of RBs in the CORESET may be a multiple of 6.

Figure 11A:
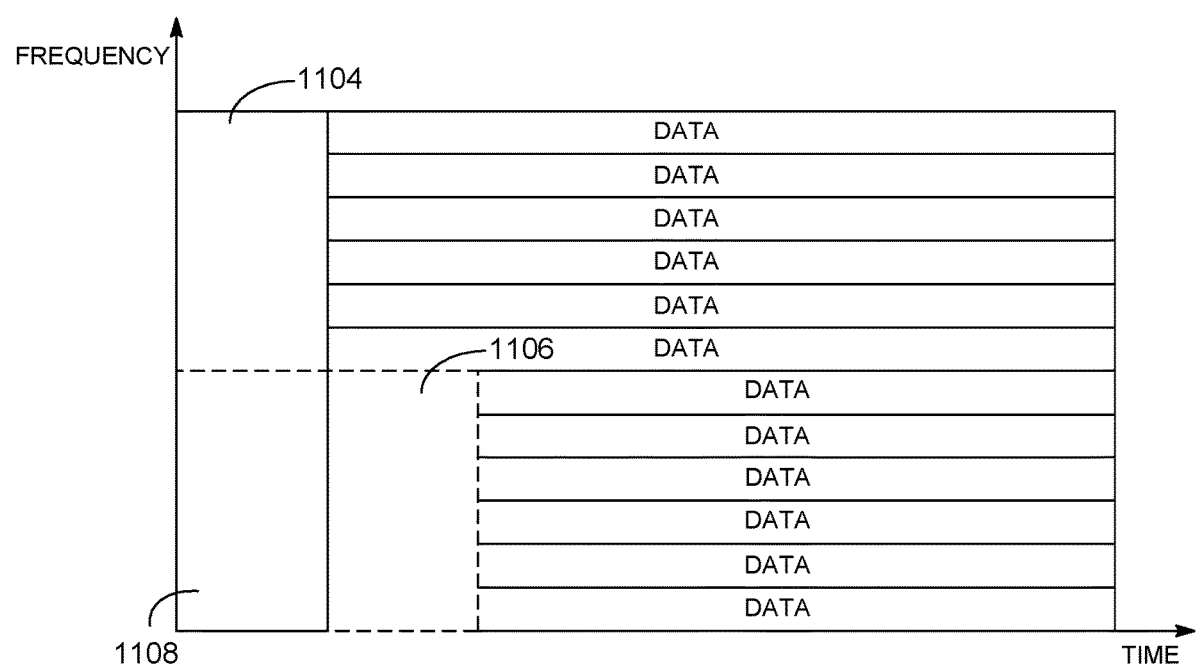
FIG. 11A shows an example of overlapping control resource sets (CORESETs).

FIG. 11A shows an example of overlapping CORESETs. Two or more different CORESETs may overlap on some resource elements. As shown in FIG. 11A, CORESET 1104 and CORESET 1106 may overlap on an overlapping part 1108. The overlapping CORESETs may have similar or different lengths in terms of numbers of OFDM symbols, numbers of resource elements, and/or types of REG-to-CCE mappings. As shown in FIG. 11A, two CORESETs with the length of 1 and 2 OFDM symbols (e.g., CORESET 1104 with the length of 1 OFDM symbol and CORESET 1106 with the length of 2 OFDM symbols) may overlap one another.

Different REG-to-CCE mappings may be defined for the overlapping resources that are shared between different CORESETs. Each different REG-to-CCE mapping may correspond to each respective CORESET. For example, in FIG. 11A, different REG-to-CCE mappings may be defined for the overlapping part 1108, with a first REG-to-CCE mapping corresponding to CORESET 1104 and a second REGto-CCE mapping corresponding to CORESET 1106. In the case of two different REG-to-CCE mappings for the overlapping CORESETs, multiple (e.g., two) REG bundles from different CORESETs may partially overlap in one or more REGs. The multiple REG bundles from different CORESETS may partially overlap and/or may not coincide with each other. Multiple (e.g., two) CCEs from two different CORESETs may partially overlap in one or more REGs and/or may not coincide with each other. For example, if a 1-symbol CORESET with localized frequency-first REG-to-CCE mapping overlaps with a 2-symbol CORESET with distributed time-first REG-to-CCE mapping, two CCEs from these two CORESETs may partially overlap on one REG.

The network may take a pattern of the overlap of CCEs from the two overlapping CORESETs into account, for example, to avoid assigning two overlapping PDCCH candidates simultaneously (e.g., to avoid collision of the two overlapping PDCCH candidates). The pattern may entail how the two CCEs overlap.

The least chance of a partial overlap between PDCCH candidates of the two overlapping CORESETs may be desirable, for example, for a design of a search space(s). The aggregation levels and/or the locations of PDCCH candidates of the two overlapping CORESETs may be considered such that the number of overlapping PDCCH candidates (e.g., candidate pairs) from two CORESETs may be minimized. For the overlapping PDCCH candidates (e.g., each overlapping pair) if any, the overlapping part may be maximized. For example, aggregation levels of 3, 6, 9 may be added for 3-symbol CORESETs, to be more in line with aggregation levels of 1, 2, 4, 8 for 1-symbol and 2-symbol CORESETs.

In assigning PDCCH candidates and designing search spaces, a partial overlap of multiple (e.g., two) PDCCH candidates from two different CORESETs may be allowed. In this case, the WTRU may use a known pattern of the overlap(s) among the PDCCH candidates, for example, to improve the performance of blind detection and/or PDCCH decoding.

A WTRU (e.g., each WTRU) may be assigned a number of possible PDCCH candidates that should be monitored for a blind detection. A collection of PDCCH candidates that are monitored by a UE may be referred to as a search space. A search space may be common among WTRUs (e.g., all WTRUs) in a Cell. A search space may be group-common. For example, a group-common search space may be common to a group of WTRUs. A search space may be WTRU-specific. One or more common search space may be used for an initial access and/or for PDCCH carrying downlink control information (DCI) (e.g., system information and/or paging). Different common search spaces may correspond to and/or be scrambled by different RNTI (e.g., a SI-RNTI for system information and/or a preemption-indication (PI)-RNTI for preemption-indication). The location of a PDCCH candidate which carries certain group-common DCI (e.g., a slot format indication (SFI)) within a search space may be fixed and/or may be known to the WTRU. The WTRU may detect and/or decode the group-common DCI, for example, without performing a (e.g., any) blind decoding among the PDCCH candidates comprised in the search space. In an example, a search space carrying a PDCCH candidate which includes an SFI may have one candidate (e.g., only one candidate), for example, different from a common or WTRU-specific search space. A common or WTRU-specific search space may include multiple PDCCH candidates.

A WTRU-specific search space (e.g., for each WTRU) may be configured by higher layer signaling (e.g., at least in the case of non-initial access). A WTRU-specific search space (e.g., as configured by the higher layer signaling) may indicate (e.g., specify) a set of PDCCH candidates for a DCI format size and/or aggregation level (e.g., each DCI format size and each aggregation level in a given CORESET). The set of PDCCH candidates may be empty for some combinations of DCI format size(s) and/or aggregation level(s). The total number of PDCCH candidates that should be monitored by a WTRU may be limited by a fixed number corresponding to the WTRU. The fixed number corresponding to the WTRU may indicate the blind decoding capability of the WTRU. WTRU-specific search spaces of multiple (e.g., two) different WTRUs may overlap, e.g., on one or more PDCCH candidates. A WTRU-specific search space may overlap with a common (e.g., group-common) search space. A search space may be entirely inside (e.g., within) one CORESET. A common search space may be within a CORESET which is configured with an interleaving REG-to-CCE mapping. A WTRU-specific search space may be within a CORESET with an interleaving REG-to-CCE mapping and/or a non-interleaving REG-to-CCE mapping.

WTRU-specific hierarchical and semi-hierarchical search spaces may be performed in multiple (e.g., two) stages. For example, a hashing function may be used to indicate a starting position(s) of PDCCH candidates of a WTRU, depending on the RNTI of the WTRU and an aggregation level(s) of the PDCCH candidates. Channel estimation may be reused for PDCCH blind detection of several PDCCH candidates, for example, in NR. Hierarchical (e.g., "nested") or semi-hierarchical WTRU-specific search space may be used, for example, to facilitate the reuse of the channel estimation. One or more of the following approaches including hashing functions and/or mapping approaches may be used for designing hierarchical or semi-hierarchical WTRU-specific search spaces: CCE mappings for two-stage hierarchical search space or a configurable semi-hierarchical search space.

Figure 11B:
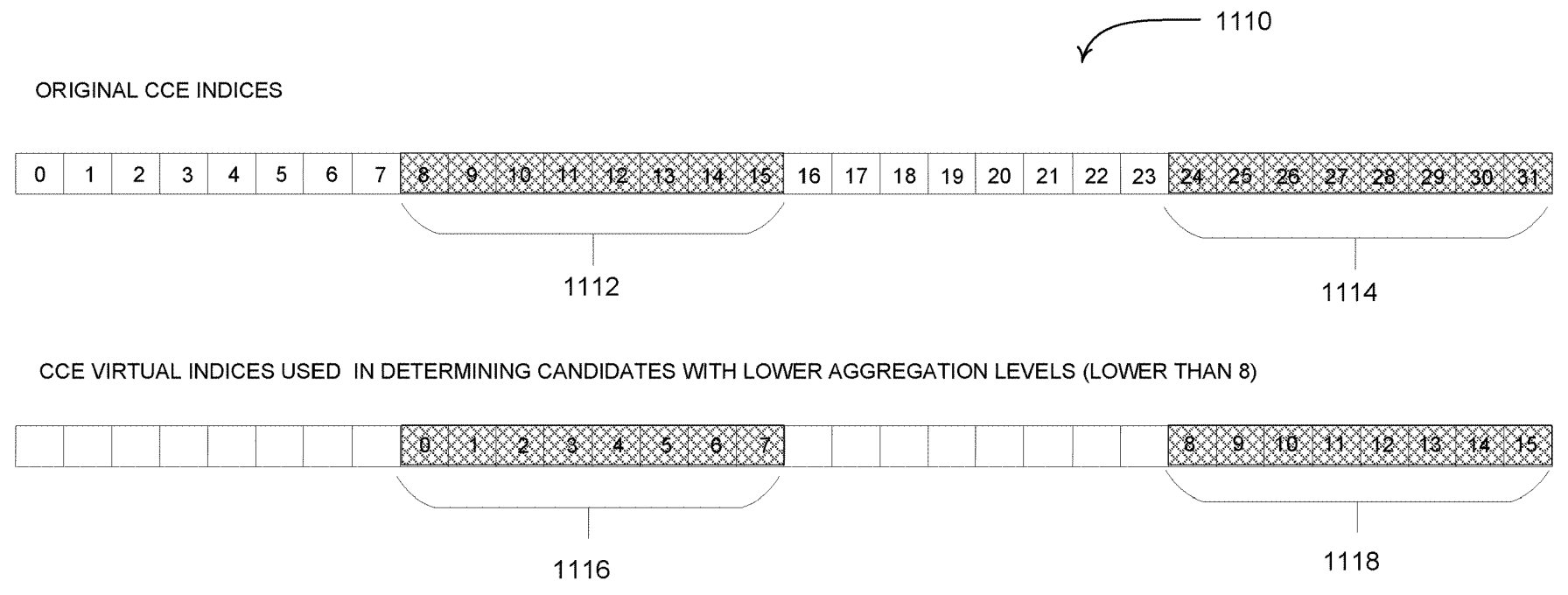

CCEs may be mapped for a two-stage hierarchical search space. The PDCCH candidates with the highest aggregation level(s) may be located, and the PDCCH candidates with lower aggregation level(s) may be located inside a region spanned by the PDCCH candidates with the highest aggregation level(s). For example, the PDCCH candidates with the highest aggregation level(s) may be located before locating the PDCCH candidates with lower aggregation level(s). A hashing function (e.g., hashing function #1) may indicate indices of the first CCEs of the PDCCH candidates with the highest aggregation level(s) that may be assigned to the search space of a WTRU. The CCEs of a PDCCH candidate may have consecutive indices beginning from a starting index. The CCEs that are covered by the PDCCH candidates may be enumerated with consecutive indices (e.g., virtual indices). A second hashing function (e.g., hashing function #2) may be used to locate the virtual indices of the first CCEs of the PDCCH candidates, for other aggregation levels. FIG. 11B shows example two-stage hierarchical search space with virtual indices. The two-stage hierarchical search space may use virtual indices for lower aggregation levels. As shown, a CORESET 1110 may include 32 CCEs, and a search space may include two candidates 1112 and 1114 with highest aggregation level(s) (e.g., 8 in this example). 0-31 may be the original indices. The original indices of CCEs may be consecutive. A starting index of a candidate with the highest aggregation level may be chosen based on a corresponding hashing function. The candidate 1112 may be associated with original indices 8-15, and the candidate 1114 may be associated with original indices 24-31. A starting index of the candidate 1116 with the highest aggregation level may be chosen based on a corresponding hashing function. The candidate 1116 may be associated with indices 0-7. The candidate 1118 may be associated with indices 8-15.

The hashing functions may indicate the starting indices of candidates for a WTRU. The hashing functions may have some or all of the following parameters as an input(s): an effective corresponding control region size(s), an RNTI(s) of the WTRU, an aggregation level(s), and/or a cell ID(s). The hashing functions may be dependent on other additional parameters. The effective corresponding control region size (s) may include the number of CCEs and/or the CORESET size for hashing function #1 used in stage 1. Stage 1 may be used to locate the PDCCH candidates with the highest aggregation level(s).

Hashing function #1 may apply to the CORESET (e.g., the entire CORESET). Hashing function #2 may apply to a region of the CORESET (e.g., a smaller sub-region that is covered with the PDCCH candidates with the highest aggregation level(s)). The effective CORESET size for hashing function #2 may be the number of CCEs in the corresponding sub-region. For example, the effective CORESET size for hashing function #2 may be 16 in the example shown in FIG. 11B.

Figure 11C:
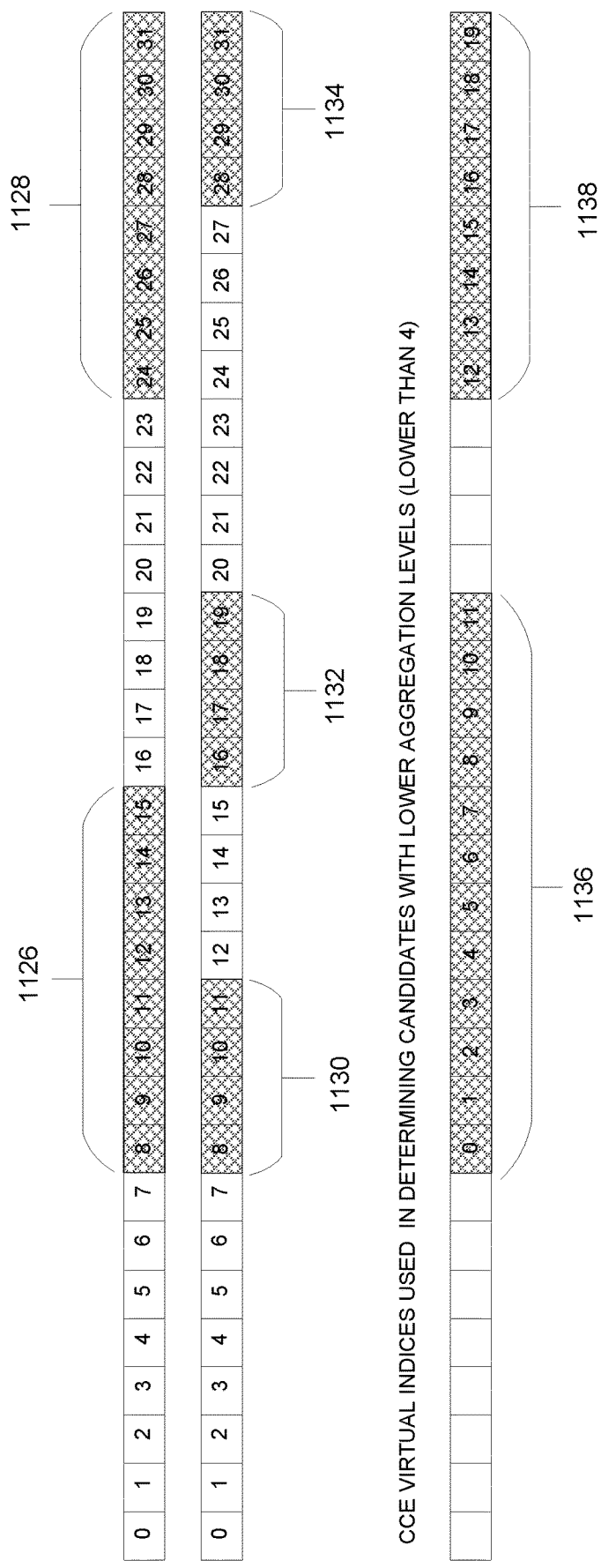
FIG. 11C shows an example of two-stage search space where the first stage may be performed for the two highest aggregation levels.

A configurable semi-hierarchical search space may be used. Hierarchical search spaces may be used to reduce channel estimation overhead. One or more approaches may be used to reduce an effect of blocking probability. For example, in the two-stage search space, the first stage may be performed for the k highest aggregation levels. FIG. 11C shows an example of configurable semi-hierarchical search space, when k=2 and the 2 highest aggregation levels are 8 and 4. The first stage may be performed for the two highest aggregation levels (e.g., 8 and 4 in this example). The sub-region that is used for locating candidates with lower aggregation levels may be the region that is covered by candidates with the two highest aggregation level(s). For example, the sub-region may include the set of CCEs that may be included in at least one of the candidates with the two highest aggregation levels. As shown in FIG. 11C, the sub-region that can be used for candidates of lower aggregation levels (e.g., a union of 1136 and 1138) may be defined as footprint of the 5 PDCCH candidates with the two highest aggregation level including PDCCH candidates 1126, 1128, 1130, 1132, and 1134. PDCCH candidate 1126 may include or cover CCEs 8-15. PDCCH candidate 1128 may include or cover CCEs 24-31. PDCCH candidate 1130 may include or cover CCEs 8-11. PDCCH candidate 1132 may include or cover CCEs 16-19. PDCCH candidate 1134 may include or cover CCEs 28-31.

As shown in FIG. 11C, PDCCH candidates with lower aggregation levels may be selected by a hashing function pointing to the virtual CCE indices in the sub-region that may be covered by the candidates with the two highest aggregation levels. There may be a trade-off between reducing the blocking probability and reducing the channel estimation overhead. For example, a smaller k may indicate more hierarchical and/or may result in a higher blocking probability and lower channel estimation overhead. The value K may be configurable. The value of k may be selected, for example, based on a desirable blocking probability and channel estimation overhead. The value of k may be selected from a set of possibilities (e.g. {1, 2}), and the selection may be included in the CORESET configuration.

For example, a highest aggregation level indication, such as a one bit in CORESET configuration, may indicate whether the corresponding search space(s) are constructed by k=1, or k=2.

Indication of an end of control region (e.g., in time) may be determined. The number of OFDM symbols used in the control region may be variable, e.g. 2, 3 or other positive integers. The control region may cover the search space(s) of a set of WTRUs, and/or may be referred to as a control resource set. The end of control region in time (e.g., the number of OFDM symbols of the control region) may be set semi-statically by mechanisms such as Radio Resource Control (RRC), and/or configured dynamically and signaled to the WTRUs by a common PDCCH.

Figure 12:
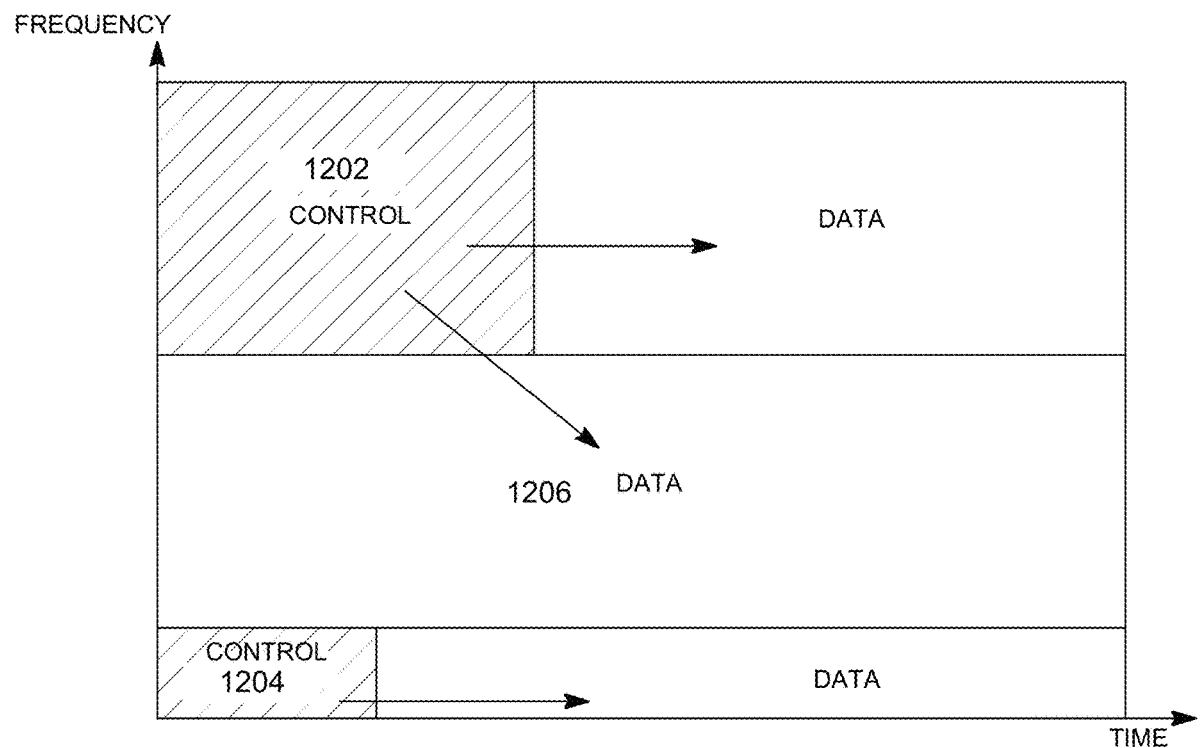
FIG. 12 shows example position of control resource set or control region in time and frequency.

FIG. 12 shows example position of a control resource set or control region in time and frequency. The size of the control region may be different in different parts of a system frequency spectrum (e.g., 1208). For example, the number of OFDM symbols in the control region may be different in different RBs. The number of OFDM symbols of the control channel may be zero in parts of the frequency spectrum (e.g., RBs). As shown in FIG. 12, the control region 1202 and the control region 1204 may be located in different parts of the system frequency spectrum and may have different sizes. The RBs (e.g., 1206) may convey data (e.g., no control information as shown in FIG. 12). To communicate information about an end of control region (e.g., in time), RBs may be grouped to reduce required information size. For example, RBs may be divided into one or more of frequency subbands, frequency blocks, or blocks of RBs (BRBs). For a BRB (e.g., a BRB including 8, 16, . . . or other integer numbers of RBs), the size of the corresponding control part (e.g., in terms of a number of OFDM symbols) may be indicated separately. For example, if the number of OFDM symbols in the control region is at most 3, the information (e.g., the number of OFDM symbols in the control region, including the possibility of zero OFDM symbols for control (e.g., sending only data)) may be sent by 2 bits. For example, if there are N blocks of RBs in overall, 2N bits may (e.g., may need to) be transmitted to WTRUs to indicate the position of the control region in the whole available system bandwidth. These 2N bits may be sent by mechanisms such as RRC, in the case of semi-static configuration, and/or be included in a common downlink control information (DCI) and be sent by a common PDCCH, in the case of dynamic configuration.

Figure 13:
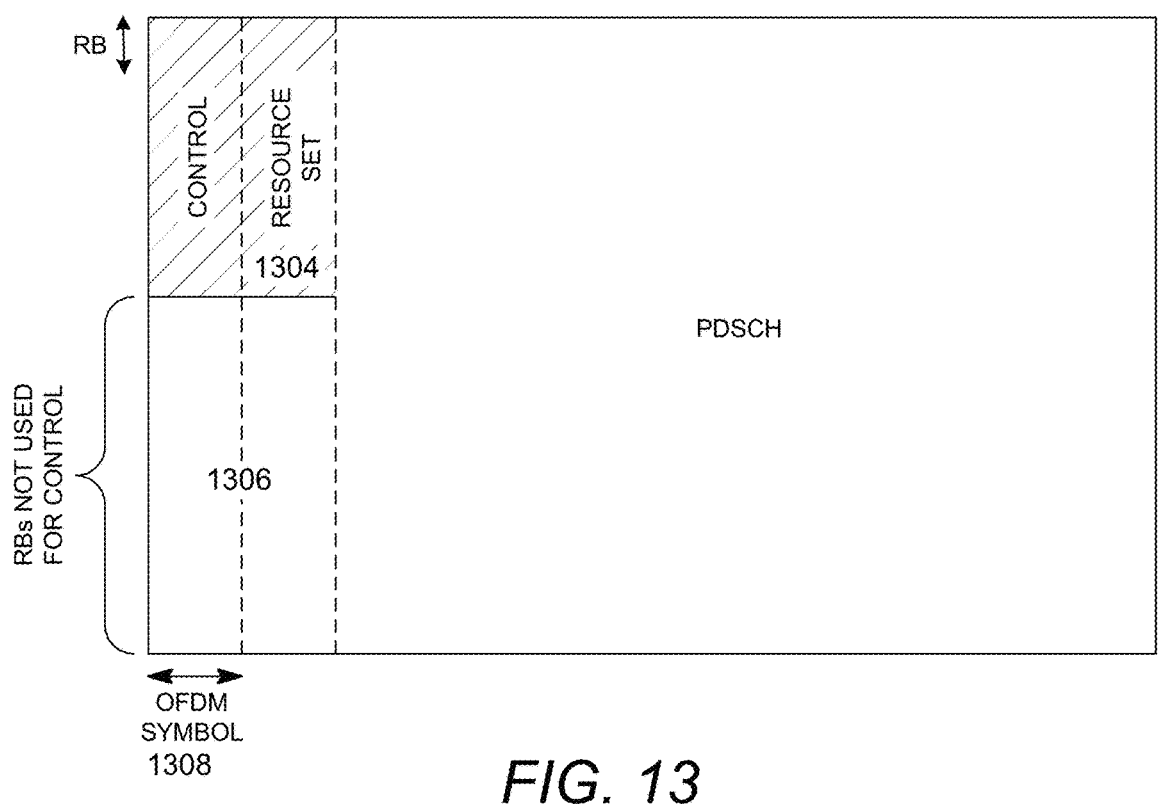
FIG. 13 shows example size of control region in terms of a number of OFDM symbols.

Frequency domain multiplexing of a control region and data in DL may be performed. FIG. 13 shows example position of a control resource set or control region in time and frequency. A control resource set 1304 that carries DL control channel (e.g., NR-PDCCH) may be partially mapped on a subband(s) used for control and/or data channel transmission. Unused resource element(s)/Resource Element Group(s)/Control Channel Element(s)/Control Resource Set (s) 1306 on the first OFDM symbols at the beginning of the slot may be used for data transmission. PDCCH and PDSCH may be multiplexed in an FDM manner in the first few OFDM symbols (e.g., OFDM symbol 1308) and TDM multiplexed for the remaining OFDM symbols within a slot, as shown in FIG. 13.

Figure 14:
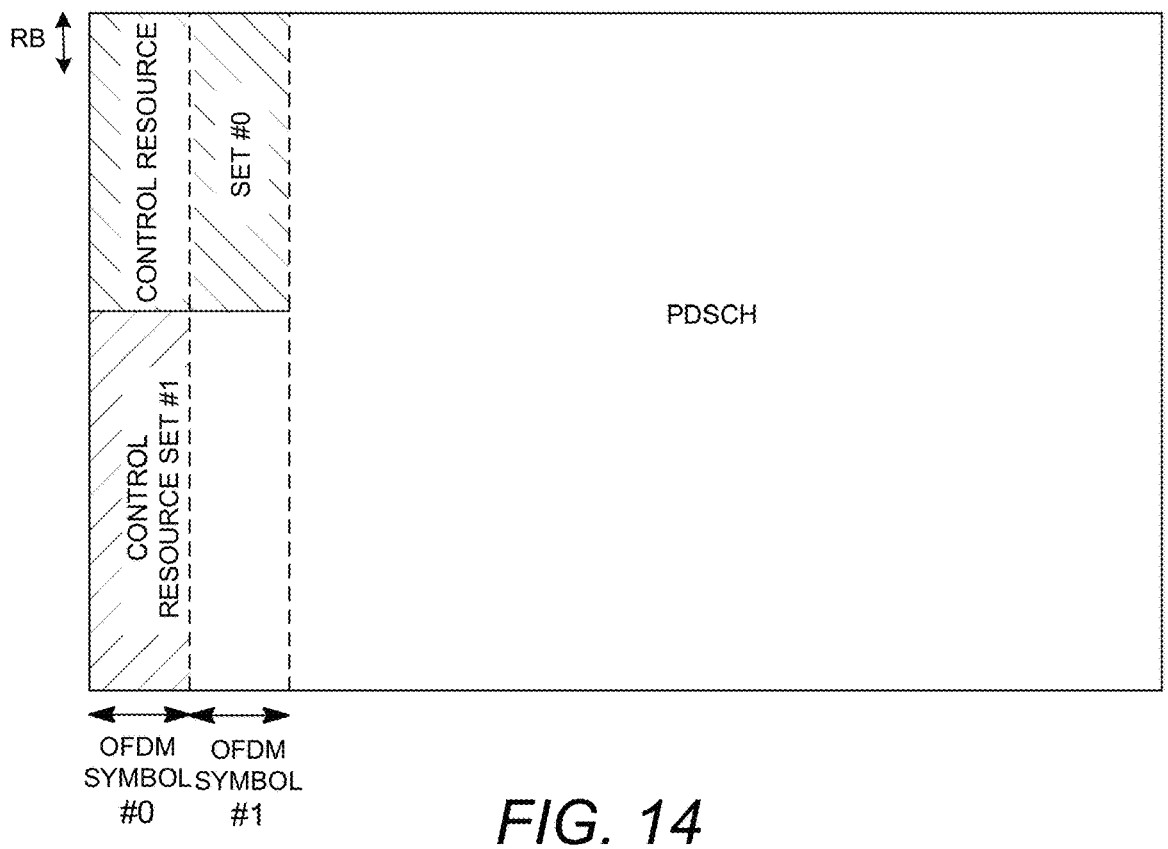
FIG. 14 shows example control resource sets having different durations.

The WTRU may determine a starting position of downlink data in a slot for a given RB or a group of RBs. The determination may be based on an explicit indication as part of the WTRU-specific DL assignment (e.g., DCI) or a group-common DCI. The starting position of downlink data in a slot for a given RB or a group of RBs may be configured semi-statically (e.g., by high-layer signaling). The WTRU may determine the starting position of DL data by assuming (e.g., implicitly) that an unused control resource set(s) within a subband are used for data transmission in a slot. FIG. 14 shows example control resource sets having different durations. For the example shown in FIG. 14, the starting position of downlink data for the upper part of the subband may be symbol #1 (e.g., assuming first symbol in the slot is symbol #0), and for the lower part of the subband the starting position of DL data may be symbol #0. The starting position of downlink data for a given control resource set(s) within a slot may be linked to a duration of the control resource set. The starting position of downlink data for the control resource set #0 may be a symbol following symbol #1 (e.g., symbol #2), and the starting position of DL data for control resource set #1 may be symbol #1, as shown in FIG. 14. The starting position of DL data in a slot may vary across the subband over which the WTRU is scheduled.

Figure 15:
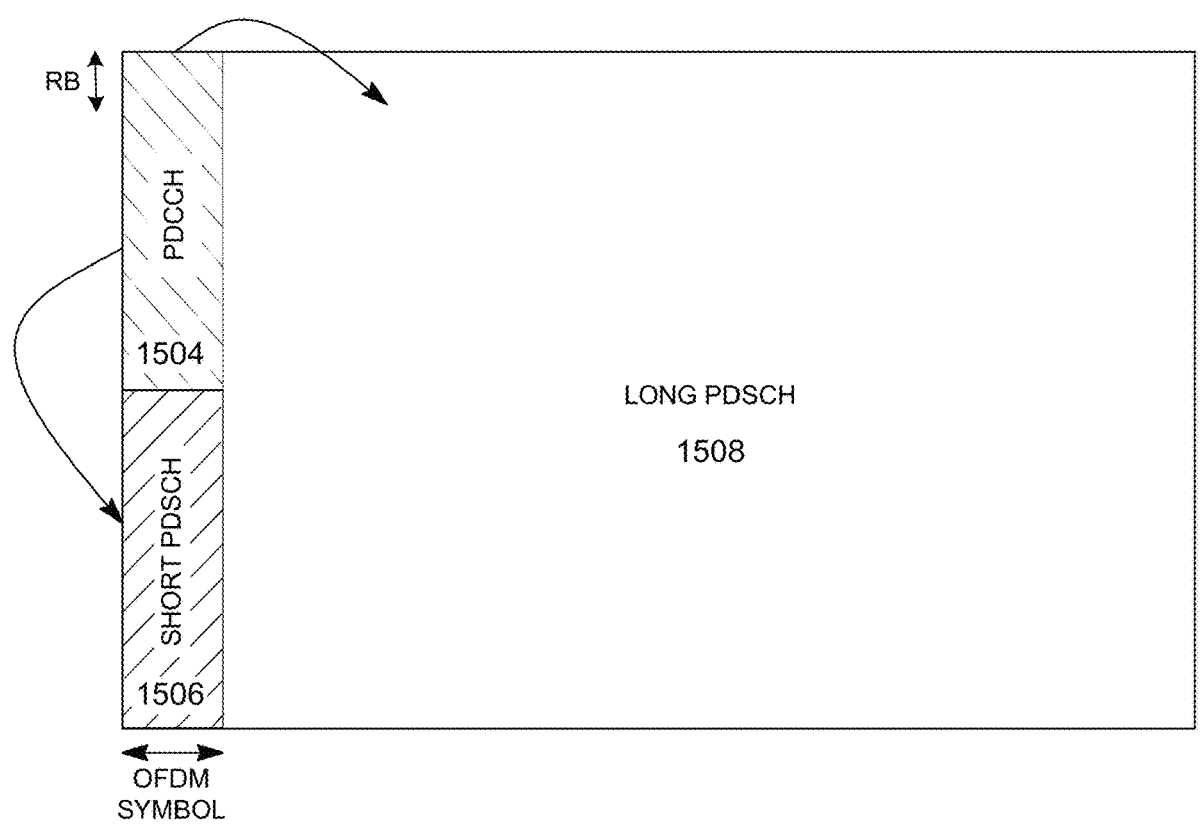
FIG. 15 illustrates example cross-frequency scheduling.

FIG. 15 illustrates example cross-frequency scheduling. The WTRU may receive multiple DL assignments in a slot. A DL assignment may carry scheduling information for data transmission on OFDM symbols that may follow the control resource set(s). For example, DL control resource sets (e.g., PDCCH 1504) may be mapped or mainly mapped on the first few OFDM symbols in a slot. PDSCH transmitted to the WTRU on the remaining OFDM symbols in a slot may have a longer duration (e.g., long PDSCH 1508, as shown in FIG. 15). The unused control resource sets may be used for data transmission in an FDM manner with control channels and/or may (e.g., mainly) span over the first OFDM symbols in a slot. The WTRU may receive a second DL assignment in a slot that may carry scheduling information for data transmission (e.g., short PDSCH 1506) on the unused control resource sets at the beginning of the slot.

A short PDSCH (e.g., short PDSCH 1506) may have a different channel encoder, rate matching, modulation or precoder compared to a long PDSCH. For coverage limited scenarios or in situations where a higher reliability is desired for a control channel, REs comprised in the PDCCH may be transmitted in a power boosted way, for example, by borrowing power from REs forming a PDSCH on the same OFDM symbol. Transmitting in the power boosted way may increase a link budget for the PDCCH in expense of a performance loss for the PDSCH. The short PDSCH may use a lower coding rate or a more robust modulation scheme compared to that of a long PDSCH.

A granularity of an unused control resource set(s) used for short PDSCH transmissions may be in multiple(s) of RBs in the frequency domain and/or multiple OFDM symbols at the beginning of a slot in the time domain. From a gNB's perspective, multiple control resource set(s) may be defined to span an entire subband. From a WTRU's perspective, the WTRU-specific and group-common search space(s) may be mapped on a subset of the control resource sets within the subband in the slot. A control resource set that is not used for DL control signaling by the gNB in a slot may be dynamically indicated as an unused control resource set to the WTRU. The indication may be provided using a bitmapping technique. For example, 4 control resource sets may be mapped to 4 bits such that '0' indicates an unused control resource set(s). Without a gNodeB indication, the WTRU may not assume resource control sets that are not used for the WTRU's search space(s) are unused resource control sets given that a subset of resource control sets can be used for control signaling for other WTRUs in a system.

In the presence of beamforming (e.g., for higher frequency bands), the WTRU may use a channel estimate derived from reference symbols or a subset of the reference symbols within the control resource set for equalizing data in a 'Short PDSCH' region. Reference symbols mapped to a subset of REs for a given OFDM symbol may be used by the WTRU for both control and data detection on the same OFDM symbol.

Transmission schemes and DMRS design may be provided for NR-PDCCH. The aspects associated with the NR-PDCCH may include one or more of the following: CRC attachment, coding, rate matching and symbol generation, frequency-only interleaving/scrambling, or mapping of NR-PDCCH resources elements. CRC attachment may be performed. The CRC may be calculated by taking into account the identity of a WTRU (e.g., a C-RNTI, or a combination of a WTRU identity and a beam identifying metric). Coding, rate matching, and/or symbol generation may be performed to create a set of REGs and CCEs. Frequency-only interleaving/scrambling may be performed by interleaving/scrambling over an entire length of a set of CCE's, and/or interleaving/scrambling over the length of individual CCEs or REGs. For example, the interleaver/scrambler may be initialized by a combination of a cell or a beam identity parameter.

An overall mapping structure of NR-PDCCH blocks may be tied to one or more transmission schemes (e.g., depending on an adopted transmission scheme). A gNB may transmit an NR-PDCCH in a number of ways. A gNB may transmit NR-PDCCH blocks by a simultaneous use of different transmission schemes (e.g., spare-frequency block coding (SFBC) and/or a precoder cycling). A gNB may use a same transmission scheme(s) over an entire NR-PDCCH region. A gNB may employ a same transmission scheme having different parameters assumptions.

In an exemplary case with different transmission schemes, a gNB may use an SFBC transmission for a set (e.g., a subset) of WTRUs and precoder cycling for another set of WTRUs in a cell. A gNB may use an SFBC transmission for an analog beam and precoder cycling for another analog beam.

In an exemplary case with a same transmission scheme, a gNB may apply precoder cycling to the WTRUs. The precoding codebook for a set (e.g., a subset) of WTRUs may differ from another set of WTRUs in a cell. A gNB may use different codebooks for precoder cycling for different analog beams.

A NR-PDCCH resource map may be divided into several zones, for example to allow efficient use of reference signals. A zone may be characterized by a span associated with the zone over time and frequency resources. A (e.g., each) zone may contain a different number of NR-PDCCH blocks and/or A (e.g., each) NR-PDCCH block include a different number of CCEs. A zone may indicate a frequency-time span in which available reference signals may be used for channel estimation and demodulation of the NR-PDCCH blocks mapped in the zone.

Figure 17:
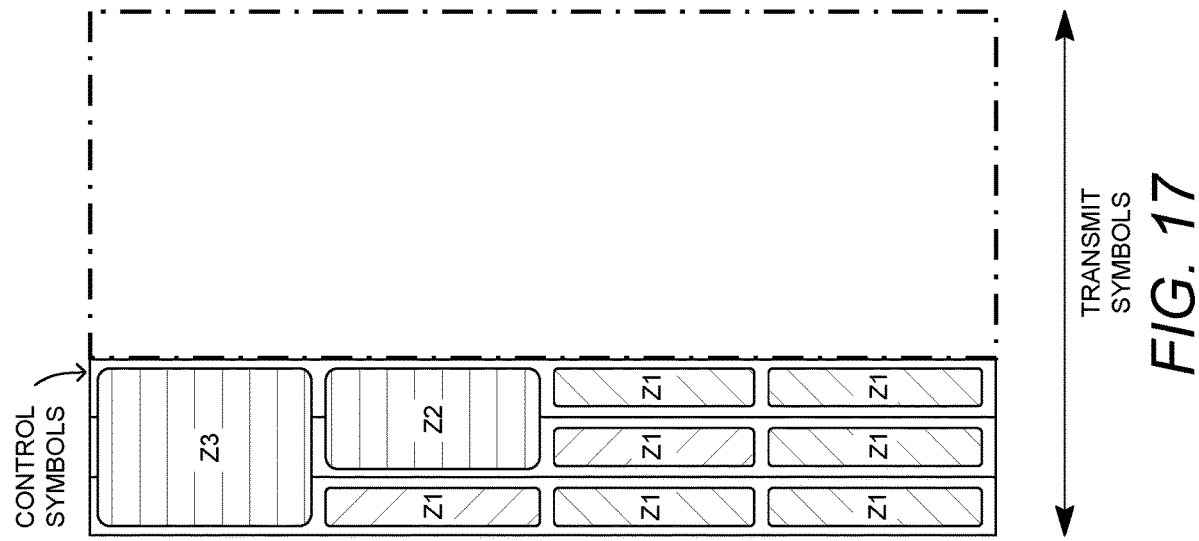
FIG. 17 shows an example organized NR-PDCCH resource mapping.
Figure 16:
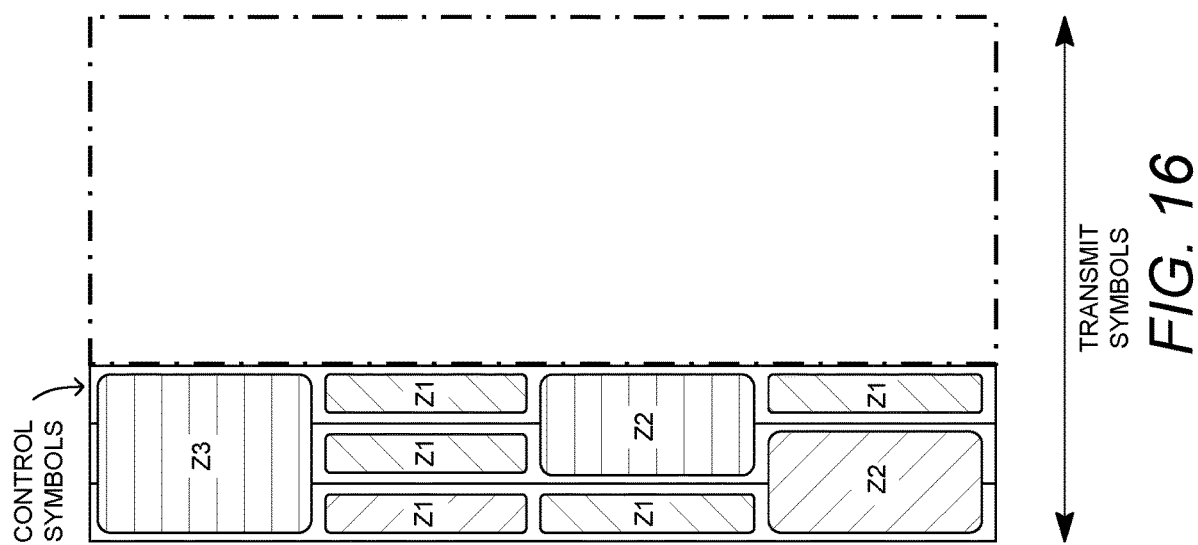
FIG. 16 shows an example mixed new radio (NR) physical downlink control channel (NR-PDCCH) resource mapping.

FIG. 16 shows an example mixed NR-PDCCH resource mapping. In FIG. 16, z1, z2 and z3 may represent three different zones for NR-PDCCH mapping. The NR-PDCCH resources may be partitioned into three regions in an organized manner. FIG. 17 shows example NR-PDCCH organized resource mapping. As demonstrated in FIG. 17, three regions (e.g., zones) may be defined in order: z1, z2 and z3.

A zone may represent a span of an area that a WTRU may consider for extracting reference signals for channel estimation and/or demodulation. For example, the zone represented by z1 may (e.g., only) offer reference signals available in a symbol over a specified span in frequency. The zone represented by z3 may represent the zone where potential available reference signals (e.g., all potential available reference signals) that span over three symbols may be used for demodulations of the NR-PDCCH blocks (e.g., all NR-PDCCH blocks mapped to the region or zone)

Definition(s) of zones may be fixed and/or configured. For example, a (e.g., each) zone may be defined by a size of the span of the zone in frequency and/or time domain along with a location of an anchor resource element. An example of the anchor resource element may be the first resource element(s) of the zone. Mapping (e.g., mixed or organized mapping) may be configured semi-statically or dynamically through L1 signaling. A mixed resource mapping may be used (e.g., mainly) with a dynamic configuration. An organized mapping may be employed (e.g., mainly) with a semi-static configuration.

In a fixed definition, a definition of partitioning may be characterized based on system bandwidth. Additional parameters may be provided through RRC signaling or L1 control. For example, for an organized resource mapping, the order and general structure of regions or zones may be a function of a system bandwidth. The number of zones per region may be indicated by higher layer signaling.

Information about the span and location of a zone may be determined by a combination of RRC signaling and L1 control.

A common zone may be defined (e.g., permanently) as a function of a system parameter, or signaled through RRC signaling to the WTRUs (e.g., all the WTRUs) or a group of WTRUs. The common zone may indicate information on the definition of zones for all or different group of WTRUs.

In the control channel, a channel estimate may be re-useable across multiple blind decodings. For a common or group control channel, a single estimate may be common for the WTRUs in the group. The DMRS may be usable across a resource set. One or more of the following may be used. An RS may include a non-precoded DMRS supporting an open loop transmit scheme such as spatial transmit diversity (e.g. STBC or SFBC) or precoder cycling for reliability. The RS may be a non-precoded DMRS supporting a closed loop transmit scheme such as closed loop precoding. The precoding matrix indicator (PMI) to be used may be signaled. In a group common control channel, the PMI may be the same for some (e.g., all) of the WTRUs in the group. For example, a group may be created from WTRUs that may support a similar PMI. The RS may be a precoded DMRS supporting a closed loop transmit scheme such as closed loop precoding. The closed loop transmit scheme may be used with a single WTRU allocated to a control resource, or a group of WTRUs that have the same PMI allocated. For above 6 GHz transmission(s), beam pairs may be used for a control channel transmission, for example, to facilitate a sufficient link margin for the control channel transmission. A beam reference signal may be used by the control channel for the WTRUs (e.g., all the WTRUs) within the beam. An open-loop or semi-open loop transmission scheme may be used for a control information transmission. A hybrid pre-coded RS (e.g., as in sub-6 GHz transmission) may be used in which both the BRS and control information are modified by a combination of analog and digital beams.

NR-PDCCH search space restriction may be configured dynamically. DL control channel search space, NR-PDCCH search space, NR-PDCCH WTRU-specific search space, NR-PDCCH common search space, NR-PDCCH group-common search space, composite search space, and search space may be used interchangeably herein.

A WTRU may monitor, receive, and/or attempt to decode NR-PDCCH candidates in a search space. An NR-PDCCH candidate may carry a downlink control information (DCI).

A WTRU may monitor or attempt to decode all or a subset of NR-PDCCH candidates in a WTRU-specific search space. In an example, if a WTRU monitors a subset of NR-PDCCH candidates in a WTRU-specific search space, the subset of NR-PDCCH candidates may be determined, selected based on WTRU-ID and/or WTRU-specific parameter, and/or configured via a WTRU-specific configuration. A WTRU-ID may include one (e.g., at least one) or more of a C-RNTI or IMSI. A WTRU-specific parameter may include one (e.g., at least one) or more of a beam-ID, a beam-pair-link ID, a transmit beam ID, a transmission mode configured, or WTRU capability. In an example, if a WTRU monitors a subset of NR-PDCCH candidates in a WTRU-specific search space, the subset of NR-PDCCH candidates may be indicated dynamically. A WTRU may be indicated to monitor all or a subset of NR-PDCCH candidates. For example, a WTRU may be configured to monitor the (e.g., all) NR-PDCCH candidates in a WTRU-specific search space. The WTRU may be configured to monitor a subset of NR-PDCCH candidates.

A set or a subset of NR-PDCCH candidates for a group-common search space may be determined based on a group-ID and/or a group-specific parameter, and/or configured via a group-specific configuration. A group-ID may be a group-specific RNTI that may be configured via higher layer signaling. A Group-ID may be determined based on a service type for a WTRU. For example, a first group-ID may be associated with a first service type (e.g., eMBB), and a second group-ID may be associated with a second service type (e.g., URLLC). A group-specific parameter(s) may include one (e.g., at least one) or more of a WTRU category, WTRU capability, a service type, a transmission mode, a coverage level, or a mode of operation.

In a search space, a WTRU may monitor one or more NR-PDCCH candidates. One or more of the NR-PDCCH candidates may carry a downlink control information (DCI). The search space may be configured, determined, and/or transmitted in a (e.g., each) slot or in a subset of slots. Hereafter, a slot may be interchangeably used with a mini-slot, a subframe, a radio frame, and a TTI. One or more of following may apply. One (e.g., at least one) or more search space(s) may be configured for a WTRU in a scheduling time interval (STI). The scheduling time interval may include one (e.g., at least one) or more of a TTI, a slot, a subframe, a radio frame, or a mini-slot. One or more search space types may be configured in an STI. The search space type may include one (e.g., at least one) or more of a WTRU-specific search space, a group-common search space, or a common search space. A WTRU may monitor or may be configured to monitor one or more search space types within an STI. One or more search space types may be located in a same control channel resource or located in a different control channel resource(s). A WTRU may receive an indication about the type(s) of search space in an STI to monitor. The number of NR-PDCCH candidates in a search space may be determined based on one (e.g., at least one) or more of a TTI index, a slot index, a subframe index, and/or a mini-slot index. The number of NR-PDCCH candidates in a search space may be determined based on the number of OFDM symbols that are used, configured, and/or determined for the search space. For example, if the number of OFDM symbols for a first search space is greater than the number of OFDM symbols for a second search space, the number of NR-PDCCH candidates for the first search space may be larger than that for the second search space. The number of NR-PDCCH candidate(s) in a search space that are monitored in a slot may be greater than that in a mini-slot.

A component search space may be used, determined, and/or defined for an NR-PDCCH. One or more NR-PDCCH candidates may be monitored within a component search space. The NR-PDCCH candidates in a component search space may include a subset of NR-PDCCH candidates in a search space (e.g., a composite search space), wherein the search space may be associated with one or more component search spaces. One or more of following may apply. A component search space may be located in N (e.g., NW) consecutive OFDM symbol(s) within a control channel resource. The control resource may be a time and/or frequency resource used or configured for NR-PDCCH. A control channel resource for a WTRU-specific search space may be configured in a WTRU-specific manner, and a control channel resource for a group-common search space may be configured in a group-specific manner. One or more NR-PDCCH candidates in a component search space may be located in the same N consecutive OFDM symbol(s). A composite search space may include one or more component search spaces. A WTRU may monitor one (e.g., at least one) or more of component search spaces in a composite search space. A WTRU may be indicated, configured, and/or determined to monitor one or more component search spaces within a composite search space. One or more component search spaces may be multiplexed in non-overlapped or partially overlapped time resources (e.g., OFDM symbols) within a control channel resource. At least one of component search spaces may be determined based on one or more of WTRU-specific parameters including a WTRU-ID, a DCI type which may be monitored by a WTRU, a slot or subframe number wherein the component search space is located, and/or a cell-ID (e.g., a virtual cell-ID). One or more time resources (e.g., OFDM symbols) may be associated with one or more component search spaces. At least one of the time resources may be determined for a WTRU to monitor NR-PDCCH. The time resource(s) may be determined based on one or more of WTRU-specific parameters, DCI type, slot or subframe number, and/or cell-ID. A composite search space may be configured via higher layer signaling. The set of component search spaces to be monitored by a WTRU within the composite search space may be indicated dynamically. An indicator may be signaled in an (e.g., each) STI to indicate a component search space for the WTRU to monitor. The number of component search spaces for a composite search space in an STI may be determined based on the number of OFDM symbols used for the composite search space in the STI. For example, if K OFDM symbols are used for a composite search space in an STI, K component search spaces may be used, determined, and/or configured in the STI. The number of OFDM symbols used for a composite search space may be dynamically determined and/or indicated in an (e.g., each) STI(s).

A CCE-to-REG mapping may be determined based on the number of component search spaces monitored by a WTRU. For example, if a WTRU is configured or determined to monitor (e.g., all) the component search spaces in a search space, a set of REGs forming a CCE may be located in a different OFDM symbol(s). The set of REGs forming the CCE may be located in a same OFDM symbol if the WTRU is configured or determined to monitor a subset of the component search spaces. One or more of following may apply.

A REG may be a set of consecutive resource elements (REs) located in the same OFDM symbol. The number of consecutive REs may be predetermined, fixed, and/or configured.

A CCE may include a set of REGs within a control channel resource, and CCE-to-REG mapping may be considered as which set of REGs may be used to form a CCE. One or more CCE types may be used. A first CCE type may be based on a set of REGs located in a same OFDM symbol, and a second CCE type may be based on a set of REGs located in multiple OFDM symbols. A first CCE type may be used when a WTRU is configured to monitor all component search spaces or all NR-PDCCH candidates in a search space. A second CCE type may be used when a WTRU is configured to monitor a subset of component search spaces or a subset of NR-PDCCH candidates in a search space.

Whether to monitor all NR-PDCCH candidates in a search pace or a subset of NR-PDCCH candidates may be determined based on one or more of the following: a slot index, a subframe index, a radio frame index, and/or a mini-slot index, system parameters including a cell-ID or a virtual cell-ID, WTRU-specific parameters including at least one of a WTRU-ID and/or transmission mode configured, a type of slot, a subframe, a radio frame, and/or a mini-slot, and/or a service type (e.g., eMBB, URLLC, mMTC).

A PDDCH may be shared among the (e.g., all) WTRUs of the cell or among a group of the WTRUs. Downlink control information (e.g., a group common DCI) may be shared among a group. The content of the group common DCI can include a slot format. The slot format may indicate whether the slot is used for DL heavy, UL heavy, all DL, all UL, or "other". "Other" may include a blank slot, or future cases that will be defined in future (e.g., reserved for now, for the sake of forward compatibility).

A group common DCI (which can be also referred to as a common DCI) may allow signaling to narrow down a search space for a WTRU. For example, the signaling may indicate the OFDM symbol(s) that may be used by a corresponding WTRU-specific PDCCH. A group common DCI may signal an end of a control region in time, for example, as described herein.

A group of WTRUs may be formed in one or more of the following ways. WTRUs may be grouped by a WTRU category or capability. WTRUs may be grouped by geography. As an example, WTRUs that are coverage limited and may require an uplink transmission using a DFT-S-OFDM based waveform may be assigned to a group. WTRUs that are not coverage limited and may perform an UL transmission using a CP-OFDM waveform may be assigned to another group. WTRUs may be grouped by a beam access. As an example, WTRUs that request access using a specific beam-pair (e.g., a specific set of beam pairs) may be grouped together. WTRUs may be grouped by a transmission scheme (s). As an example, WTRUs that use (e.g., require) a multi-layer transmit diversity scheme or WTRUs that are in a multi-total radiated power (TRP) transmission and connected to a specific set of TRPs may be grouped. WTRUs that may be served simultaneously in a MU-MIMO (e.g., UL/DL) transmission may be set as a group.

A WTRU may belong to more than one group.

The groups may be set up statically on initial access, semi-statically through RRC signaling, and/or dynamically through L1/L2 signaling. As an example, a L1 groups DCI signal may be used to send a group identifier and/or add or remove WTRUs from a group.

The specific RS may be allocated for group common PDCCH based on the composition of the group. In groups that have WTRUs widely dispersed over the cell, the RS may be a non-precoded DMRS with a transmit diversity based transmission scheme (e.g. spatial or frequency-based diversity) for reliability. In groups that have WTRUs located within a spatial region (e.g. a beam or a specific PMI), a precoded DMRS may be used with a precoder chosen in such a manner that the precoder provides adequate performance for all member WTRUs. A closed loop transmission scheme may then be used. A non-precoded DMRS with additional PMI signaling may be used with the closed loop transmission scheme.

Search space for group-common PDCCH may be monitored by the (e.g., all) WTRUs in the group. A part(s) of the group common search space may overlap with a WTRU-specific search space(s). A search space may be inside (e.g., completely inside) a control resource set (CoReSet). Multiple control resource sets may overlap in time and/or frequency. A CoReSet with a common search space may be determined (e.g., obtained) from an MIB and/or system information. A CoReSet with a common search space may be determined (e.g., derived implicitly) using initial access information. CoReSets with additional group common and/or WTRU-specific search spaces may be configured using RRC.

A mapping of REGs to CCEs may be assumed for (e.g., used inside) a search space and/or each control resource set. The same mapping of REGs to CCEs may be used. Localized and/or distributed PDCCH candidates may be in different search spaces. When a same mapping of REGs to CCEs is assumed inside each control resource set, localized and/or distributed PDCCH candidates may be in different control resource sets. Multiple (e.g., two) overlapping control resource sets may be either both distributed or both localized (e.g., no matter if they include a common search space or WTRU-specific search spaces).

A hierarchical or multi-stage DCI structure may be formed (e.g., to enable a lean design and minimize control channel overhead by sending minimum amount of information needed to enable a WTRU to obtain the WTRU's control information. In one example of a multi-layer structure, a 3 layer-structure (with additional sub-levels) may be used. Level 1 may include system information. The system information may be derived from a broadcast channel and may be derived from a 2-stage broadcast channel. In the 2-stage broadcast channel, the first stage may send minimum system information, and the second stage may send additional information on demand. Level 2 may include a group common DCI(s). Level 2 may be optional. Information common to a group of WTRUs may be sent in a one-shot transmission. As an example, the use of the group common DCI may specify (e.g., implicitly) the resources a WTRU may check during control channel decoding and/or reduce the amount of blind decoding required. Level 3 may include user specific DCI. User specific DCI may include information that may be specific to the transmitting/receiving WTRU and may include one or more of the following information: PMI, channel quality indicator (CQI), transmit power requested, transmit scheme, resources, or the like. This type of information may be multi-stage. Long-term information may be separated from rapidly changing information, for example, to enable a further reduction in the overhead. Level 3 may include one or more sublevels. For example, level 3.1 may include user specific DCI stage 1. Level 3.2 may include user specific DCI stage 2.

A DCI layer may be determined by the gNB and/or may be requested on-demand by a WTRU. In a group common DCI, a request from a WTRU that is a member of the group may trigger sending of all or partial group information. The request may be a modified service request that may demand general or specific information.

The processes and instrumentalities described herein may apply in any combination, may apply to other wireless technologies, and for other services.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, terminal, base station, RNC, and/or any host computer.

What is claimed:

1. A device comprising:
   a processor; and
   a memory configured to communicate with the processor and store instructions that, when executed by the processor, cause the device to:
   receive control resource set (CORESET) configuration information;
   determine a control channel element (CCE)-to-resource element group (REG) mapping for a CORESET based on the CORESET configuration information, wherein the CCE-to-REG mapping indicates a REG bundle associated with the CCE, wherein:
   the REG bundle includes a plurality of REGs, wherein a mapping of the plurality of REGs to the REG bundle is determined based on a number of REGs included in the REG bundle and a number of REGs in the CORESET; and
   the CCE-to-REG mapping is determined as a function of an index associated with the CCE and the number of the REGs included in the REG bundle; and
   decode a physical downlink control channel (PDCCH) transmission associated with the CORESET based on the determined CCE-to-REG mapping.

2. The device of claim 1, wherein a plurality of REGs in the CORESET are numbered in an increasing order in a time-first manner.

3. The device of claim 1, wherein a plurality of REGs in the CORESET are numbered in an increasing order in frequency.

4. The device of claim 1, wherein the processor is further configured to determine whether the CCE-to-REG mapping is interleaved or non-interleaved based on the CORESET configuration information.

5. The device of claim 4, wherein on a condition that the CORESET configuration information indicates that the CCE-to-REG mapping is interleaved, the CCE-to-REG mapping is determined based on a modulo operation that uses a modulo base, wherein the modulo base is the number of REG bundles in the CORESET.

6. The device of claim 5, wherein the modulo operation has a multiplying factor that is a function of the number of REG bundles in the CORESET.

7. The device of claim 4, wherein the processor is further configured by radio resource control signaling to determine whether the CCE-to-REG mapping is interleaved or non-interleaved.

8. The device of claim 1, wherein the CORESET comprises a plurality of REGs that are numbered in an increasing order in frequency when the CORESET covers one orthogonal frequency-division multiplex (OFDM) symbol.

9. The device of claim 1, wherein the CORESET comprises a plurality of REGs in the CORESET that are numbered based on a number of orthogonal frequency-division multiplex (OFDM) symbols in the CORESET.

10. A method comprising:
receiving control resource set (CORESET) configuration information;
determining a control channel element (CCE)-to-resource element group (REG) mapping for a CORESET based on the CORESET configuration information, wherein the CCE-to-REG mapping indicates a REG bundle associated with the CCE wherein:
the REG bundle includes a plurality of REGs, wherein a mapping of the plurality of REGs to the REG bundle is determined based on a number of REGs included in the REG bundle and a number of REGs in the CORESET; and
the CCE-to-REG mapping is determined as a function of an index associated with the CCE and the number of the REGs included in the REG bundle; and
decoding a physical downlink control channel (PDCCH) transmission associated with the CORESET based on the determined CCE-to-REG mapping.

11. The method of claim 10, wherein a plurality of REGs in the CORESET are numbered in an increasing order in a time-first manner.

12. The method of claim 10, wherein a plurality of REGs in the CORESET are numbered in an increasing order in frequency.

13. The method of claim 10, further comprising determining whether the CCE-to-REG mapping is interleaved or non-interleaved based on the CORESET configuration information.

14. The method of claim 13, wherein on a condition that the CORESET configuration information indicates that the CCE-to-REG mapping is interleaved, the CCE-to-REG mapping is determined based on a modulo operation that uses a modulo base, wherein the modulo base is the number of REG bundles in the CORESET.

15. The method of claim 14, wherein the modulo operation has a multiplying factor that is a function of the number of REG bundles in the CORESET.

16. The method of claim 13, further comprising configuring by radio resource control signaling to determine whether the CCE-to-REG mapping is interleaved or non-interleaved.

17. The method of claim 10, wherein the CORESET comprises a plurality of REGs that are numbered in an increasing order in frequency when the CORESET covers one orthogonal frequency-division multiplex (OFDM) symbol.

18. The method of claim 10, wherein the CORESET comprises a plurality of REGs in the CORESET that are numbered based on a number of orthogonal frequency-division multiplex (OFDM) symbols in the CORESET.

19. A non-transitory computer readable medium having stored instructions which, when executed by a processor, cause the processor to perform the method of claim 10.

20. A non-transitory computer readable medium having stored instructions which, when executed by a processor, cause the processor to perform the method of claim 14.

* * * * *